(12) United States Patent
Roberts, Jr. et al.

(10) Patent No.: US 12,184,490 B2
(45) Date of Patent: Dec. 31, 2024

(54) AUTOMATED CONFIGURATION AND DEPLOYMENT OF CONTACT CENTER SOFTWARE SUITE

(71) Applicant: Genesys Cloud Services, Inc., Menlo Park, CA (US)

(72) Inventors: John Roberts, Jr., Oklahoma City, OK (US); Matthew Robinson, Toowong (AU)

(73) Assignee: Genesys Cloud Services, Inc., Menlo Park, CA (US)

( * ) Notice: Subject to any disclaimer, the term of this patent is extended or adjusted under 35 U.S.C. 154(b) by 45 days.

(21) Appl. No.: 16/729,962

(22) Filed: Dec. 30, 2019

(65) Prior Publication Data

US 2021/0203545 A1    Jul. 1, 2021

(51) Int. Cl.
*H04L 41/082*    (2022.01)
*H04L 67/00*    (2022.01)
*H04M 3/51*    (2006.01)

(52) U.S. Cl.
CPC .......... *H04L 41/082* (2013.01); *H04L 67/34* (2013.01); *H04M 3/5183* (2013.01)

(58) Field of Classification Search
CPC .... H04L 41/082; H04L 67/34; H04M 3/5183; G06F 8/61
See application file for complete search history.

(56) References Cited

U.S. PATENT DOCUMENTS 10,635,498 B2 * 4/2020 Bansal ................. G06F 9/5061
11,531,537 B2 * 12/2022 Negoshian ............ G06Q 40/12

| | | | |
|---|---|---|---|
| 2003/0078959 A1* | 4/2003 | Yeung | G06F 8/65 709/201 |
| 2005/0081189 A1* | 4/2005 | Krasikov | G06F 8/73 717/123 |
| 2005/0102665 A1* | 5/2005 | Barta | G06F 8/61 717/174 |
| 2009/0228879 A1* | 9/2009 | Blohm | G06F 8/60 717/174 |
| 2010/0115077 A1* | 5/2010 | Tameshige | H04L 41/06 709/223 |
| 2010/0325624 A1* | 12/2010 | Bartolo | G06F 8/61 717/176 |

(Continued)

OTHER PUBLICATIONS

International Search Report; Commissioner for Patents Mail Stop PCT; International Application No. PCT/US2020/056796; Nov. 30, 2020; 2 pages.

(Continued)

*Primary Examiner* — William G Trost, IV
*Assistant Examiner* — Abdelbasst Talioua
(74) *Attorney, Agent, or Firm* — Taft Stettinius & Hollister LLP

(57) ABSTRACT

A method for automated deployment of application servers in a contact center system according to one embodiment includes generating a deployment package for the application servers in the contact center system based on deployment sizing information and environment information associated with the contact center system preparing a temporary deployment server of the contact center system for deployment of software to the application servers, and installing the software to the application servers using the temporary deployment server.

20 Claims, 27 Drawing Sheets

(56) References Cited

U.S. PATENT DOCUMENTS

| | | | |
|---|---|---|---|
| 2014/0079207 A1* | 3/2014 | Zhakov | H04M 3/5175 379/265.03 |
| 2015/0350101 A1* | 12/2015 | Sinha | H04L 67/10 709/226 |
| 2016/0067864 A1* | 3/2016 | Mullan | B25J 9/1605 700/19 |
| 2016/0321067 A1* | 11/2016 | Harrison | G06F 11/3604 |
| 2017/0134519 A1* | 5/2017 | Chen | H04L 67/10 |
| 2017/0168811 A1* | 6/2017 | Petri | G06F 16/2365 |
| 2017/0288955 A1* | 10/2017 | Yin | H04L 43/0817 |
| 2017/0344354 A1* | 11/2017 | Schiefelbein | G06F 8/61 |
| 2018/0254906 A1* | 9/2018 | Tofts | G06F 21/51 |
| 2018/0367672 A1 | 12/2018 | Ristock et al. | |
| 2019/0018965 A1* | 1/2019 | Hoscheit | H04L 63/1408 |
| 2019/0114432 A1* | 4/2019 | Tang | G06F 1/26 |
| 2019/0138287 A1* | 5/2019 | De Capoa | G06F 9/50 |
| 2019/0149614 A1* | 5/2019 | Shibamoto | H04L 67/10 709/227 |
| 2019/0155614 A1* | 5/2019 | York | H04L 67/06 |
| 2019/0156246 A1* | 5/2019 | Kuo | G06K 9/6256 |
| 2019/0260663 A1* | 8/2019 | Pueblas | H04L 41/16 |
| 2019/0286452 A1* | 9/2019 | Carlson | G06F 9/4416 |
| 2019/0286453 A1* | 9/2019 | Yamazaki | G06F 9/445 |
| 2019/0294531 A1* | 9/2019 | Avisror | G06F 11/3692 |
| 2019/0327209 A1* | 10/2019 | Seferiadis | H04L 61/5007 |
| 2019/0370437 A1* | 12/2019 | Jha | G06F 9/45533 |
| 2020/0014607 A1* | 1/2020 | Gangadhar | H04L 67/34 |
| 2020/0201682 A1* | 6/2020 | Gossman | G06F 9/4881 |
| 2020/0349126 A1* | 11/2020 | Landman | G06F 16/1844 |
| 2021/0028987 A1* | 1/2021 | Krivenok | H04L 41/0869 |
| 2021/0067607 A1* | 3/2021 | Gardner | H04L 41/082 |
| 2021/0157560 A1* | 5/2021 | Orozco | G06F 11/3688 |
| 2021/0224099 A1* | 7/2021 | Luo | G06F 8/63 |
| 2022/0283795 A1* | 9/2022 | Huang | G06F 8/76 |

OTHER PUBLICATIONS

Written Opinion of the International Searching Authority; Commissioner for Patents Mail Stop PCT; International Application No. PCT/US2020/056796; Nov. 30, 2020; 9 pages.

International Preliminary Report on Patentability; International Preliminary Examining Authority; International Application No. PCT/US2020/056796; Dec. 10, 2021; 37 pages.

* cited by examiner

| ⌖ Accelerator Automation Tool | | 3.9.6 API 3.9.5, Octane 2.8.9 | | | | ⌖ Jeremy Holcomb | |
|---|---|---|---|---|---|---|---|
| Dashboard | | | | | | New project | |
| All user projects (2) — 502 | | — 504 | | | | | |
| 506 | Project name | Description | Environments | Region | Project Type | Creator | Last activity | Last modified by |
| ☆ | NFCU demo for Jeremy | | 18 | NA | Deployment Pure Engage Premise | John TL Roberts | Today | Jeremy Holcomb |
| ☆ | Johns Test | | 14 | NA | Deployment Pure Engage Premise | John TL Roberts | Apr 18, 2019 | John TL Roberts |

⌖ Accelerator Automation Tool 3.9.6 API 3.9.5, Octane 2.8.9     👤 Jeremy Holcomb All active projects
☆ NFCU demo for Jeremy
○ NA New environment ─ 504     ⚙ | Project documentation ⌄

| | Environment | Progress | Servers | Groups | Solutions | Description |
|---|---|---|---|---|---|---|
| ⊙ | CAS_Update | ●●●●●● | 58 | 0 | ▪▫▫▫▫ | Updating FeaturePacks for Cassandra nodes |
| ▫ | DUAL_CAS_UPDATE | ●●●●●○ | 122 | 0 | ▪▫▫▫▫ | |
| ▫ | DUAL_DEDICATED_GCB_Cas | ●●●●●○ | 48 | 0 | ▪▫▫▫▫▫ | |
| ⊙ | DUAL_SHARED_GCB_Cas | ●●●●●● | 48 | 0 | ▪▫▫▫▫▫ | |
| ⊙ | FP_VC_DG_ORS_CAS_Update | ●●●●●● | 18 | 0 | ▪▫▫▫▫▫ | FeaturePack update for DigitalVoice ORS Cassandras |
| ⊙ | FP_VC_DG_ORS_Cas_DUAL_UPDATE | ●●●●●● | 32 | 0 | ▪▫▫▫▫▫ | |
| ⊙ | FP_VC_DG_ORS_CAS_Shared_UPDATE | ●●●●●● | 16 | 0 | ▪▫▫▫▫▫ | |
| ⊙ | Lab4R8 | ●●●●●○ | 6 | 0 | ▪▫▫▫▫ | Linux LCA and Flex LM |
| ▫ | SINGLE_DEDICATED_GCB_Cas | ●●●●●○ | 24 | 0 | ▪▫▫▫▫▫ | |

| Accelerator Automation Tool | 3.9.6 API 3.9.5, Octane 2.8.9 | | | Jeremy Holcomb | | |
|---|---|---|---|---|---|---|

Dashboard

All user projects (2)

| | Project name | Description | Environments | Region | Project Type | Creator | Last activity | Last modified by |
|---|---|---|---|---|---|---|---|---|
| ☆ | NFCU demo for Jeremy | | 1 | NA | Deployment Pure Engage Premise | John TL Roberts | May 2, 2019 | John TL Roberts |
| ☆ | Johns Test | | 14 | NA | Deployment Pure Engage Premise | John TL Roberts | Apr 18, 2019 | John TL Roberts |

FIG. 8

New project

Add project details

Name [Add a project name]

Region [Select a region ∨]

Project Type [Select a project type ∨]

Description [Add a description]

Cancel

< Back

Next > — 512

| Environment | Progress | Servers | Groups | Solutions | Description |
|---|---|---|---|---|---|
| CAS_Update | ●●●●● | 58 | 0 | ▪▫✓✓● | Updating FeaturePacks for Cassandra nodes |
| DUAL_CAS_UPDATE | ●●●●○ | 122 | 0 | ▪▫✓✓● | |
| DUAL_DEDICATED_GCB_Cas | ●●●●○ | 48 | 0 | ▪▫✓✓●✓ | |
| DUAL_SHARED_GCB_Cas | ●●●●● | 48 | 0 | ▪▫✓✓●✓ | |
| FP_VC_DG_ORS_CAS_Update | ●●●●● | 18 | 0 | ▪▫✓✓●✓ | Feature Pack update for Digital/Voice ORS Cassandras |
| FP_VC_DG_ORS_Cas_DUAL_UPDATE | ●●●●● | 32 | 0 | ▪▫✓✓●✓ | |
| FP_VC_DG_ORS_CAS_Shared_UPDATE | ●●●●● | 16 | 0 | ▪▫✓✓●✓ | |

AUTOMATED CONFIGURATION AND DEPLOYMENT OF CONTACT CENTER SOFTWARE SUITE

BACKGROUND

Contact centers are used by many organizations to provide technical and other support to its end users. The end user may interact with the contact center by establishing electronic communications via one or more communication technologies including, for example, telephone, email, web chat, Short Message Service (SMS), dedicated software application(s), and/or other communication technologies.

Those organizations utilizing contact centers are often large organizations with very specific requirements for various combinations of solutions within the contact center software suite. Due to the wide range of solutions and the variety of deployment options, configuration of the software suite deployed by contact centers can be very complex and have a high degree of subjectivity. Coupled with the various horizontal scaling options and the various external components such as operating systems, database types, network load balancers, and other components, there are many variables or "levers" to be configured to ensure proper system operation. Although those "levers" are described in thousands of pages of manuals, it is often only experience that guides one to the optimal settings for a particular contact center software suite.

SUMMARY

According to an embodiment, a method for automated deployment of application servers in a contact center system may include generating a deployment package for the application servers in the contact center system based on deployment sizing information and environment information associated with the contact center system, preparing a temporary deployment server of the contact center system for deployment of software to the application servers, and installing the software to the application servers using the temporary deployment server.

In some embodiments, the deployment sizing information may include an estimate of resource utilizations for the contact center system.

In some embodiments, the environment information may include a name and address of a physical server to which at least a portion of the software is to be deployed.

In some embodiments, the method may further include determining one or more deployment configuration standards, and generating the deployment package may include generating the deployment package for the application servers in the contact center system based on the deployment sizing information, the environment information associated with the contact center system, and the deployment configuration standards.

In some embodiments, the method may further include determining one or more operational parameters for the contact center system, and generating the deployment package may include generating the deployment package for the application servers in the contact center system based on the deployment sizing information, the environment information associated with the contact center system, and the operational parameters.

In some embodiments, the method may further include validating the environment information against the contact center system, and preparing the temporary deployment server of the contact center system may include preparing the temporary deployment server in response to successful validation of the environment information.

In some embodiments, preparing the temporary deployment server of the contact center system may include loading configurations for the contact center system into the temporary deployment server based on the deployment package.

In some embodiments, the temporary deployment server is an appliance.

In some embodiments, the method may further include generating documentation based on the deployment package.

In some embodiments, generating the deployment package for the application servers may include determining interdependencies for the software to be installed to the application servers.

According to another embodiment, a system for automated deployment of application servers in a contact center system may include at least one processor and at least one memory comprising a plurality of instructions stored thereon that, in response to execution by the at least one processor, causes the system to generate a deployment package for the application servers in the contact center system based on deployment sizing information and environment information associated with the contact center system, prepare a temporary deployment server of the contact center system for deployment of software to the application servers, and install the software to the application servers using the temporary deployment server.

In some embodiments, the deployment sizing information may include an estimate of resource utilizations for the contact center system.

In some embodiments, the environment information may include a name and address of a physical server to which at least a portion of the software is to be deployed.

In some embodiments, the plurality of instructions may further cause the system to determine one or more deployment configuration standards, and generation of the deployment package may include generation of the deployment package for the application servers in the contact center system based on the deployment sizing information, the environment information associated with the contact center system, and the deployment configuration standards.

In some embodiments, the plurality of instructions may further cause the system to determine one or more operational parameters for the contact center system, and generation of the deployment package may include generation of the deployment package for the application servers in the contact center system based on the deployment sizing information, the environment information associated with the contact center system, and the operational parameters.

In some embodiments, the temporary deployment server is an appliance.

In some embodiments, to generate the deployment package for the application servers may include to determine interdependencies for the software to be installed to the application servers.

According to yet another embodiment, a system may include a contact center system including a temporary deployment server and a plurality of application servers and a server. The server may include a processor and a memory having a plurality of instructions stored thereon that, in response to execution by the processor, causes the server to generate a deployment package for the application servers in the contact center system based on deployment sizing information, one or more deployment configuration standards, and environment information associated with the contact center system. The temporary deployment server of the contact center system may be prepared for deployment of software to the application servers, and the temporary deployment server may install the software to the application servers.

In some embodiments, the deployment sizing information may include an estimate of resource utilizations for the contact center system and the environment information may include a name and address of a physical server to which at least a portion of the software is to be deployed.

In some embodiments, to generate the deployment package for the application servers may include to determine interdependencies for the software to be installed to the application servers.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIGS. 5-27 illustrate various states of at least one embodiment of a graphical user interface of an application executed by the system of FIG. 1.

DETAILED DESCRIPTION

Figure 1:
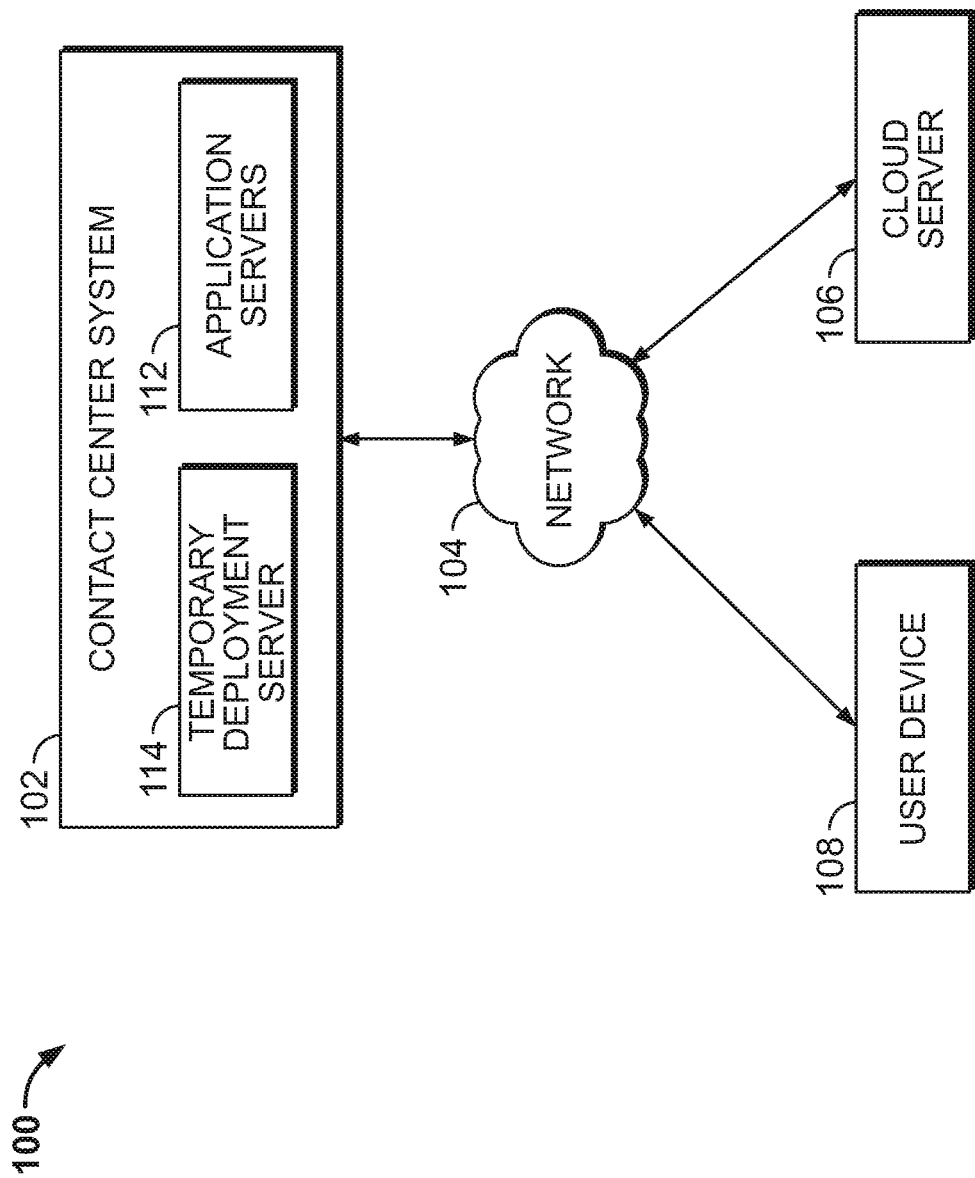
FIG. 1 is a simplified block diagram of at least one system for the automated deployment of application servers in a contact center system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for automated deployment of application servers in a contact center system includes a contact center system 102, a network 104, a cloud server 106, and a user device 108. Further, as shown in FIG. 1, the illustrative contact center system 102 includes a plurality of application servers 112 and a temporary deployment server 114. Although only one contact center system 102, one network 104, one cloud server 106, one user device 108, and one temporary deployment server 114 are shown in the illustrative embodiment of FIG. 1, the system 100 may include multiple contact center systems 102, networks 104, cloud servers 106, user devices 108, and/or temporary deployment servers 114 in other embodiments. For example, in some embodiments, the same user device 108 may be used to deploy and configure application servers 112 of multiple contact center systems 102.

As described in detail below, in the illustrative embodiment, the system 100 may determine and generate a deployment package based on deployment sizing information for the contact center system 102 installation, environment information associated with the contact center system 102, contact center deployment standards applicable to the contact center system 102, operational parameters for the contact center installation, and/or other factors relevant to the deployment and configuration of the contact center software suite. The system 100 may prepare a temporary deployment server (e.g., the temporary deployment server 114, an appliance, and/or another temporary deployment device/system) of the contact center system 102 for deployment of the relevant software to the application servers 112 and install the software to the relevant application servers 112 using the temporary deployment server (e.g., the temporary deployment server 114).

For example, in some embodiments, a list or other report/compilation of the various application servers 112 is generated based on the sizing requirements of the contact center system 102 including, for example, the number/size of servers and the application(s) to be installed on the various servers (e.g., identifying which application(s) are to be installed on each server). The server/application data in that list may be "married," correlated, or otherwise supplemented with the environment information of the contact center system 102 (e.g., server names/addresses, directories to which to install applications, databases being used, relevant credential information, and/or other environment-specific information) in order to render the data context aware and specific to the contact center system 102 for generation of the deployment package. In some embodiments, the deployment package may be "fed" into an appliance (e.g., the temporary deployment server 114 or other temporary deployment device/system), which may include Chef server and/or another suitable infrastructure-as-a-service or infrastructure deployment code/system that parses the information in the deployment package. Further, the deployment package may provide the information needed to bootstrap each of the application servers 112, install the relevant servers and applications, and perform any post-installation and environment-readiness work (e.g., creating log directories, etc.). Thereafter, a subject matter expert may perform further customization and configuration of the contact center system 102 based on the installed and configured software suite to accommodate the needs of the particular contact center.

It should be appreciated that each of the contact center system 102, the cloud server 106, the user device 108, the application servers 112, and/or the temporary deployment server 114 may be embodied as any type of device or collection of devices suitable for performing the functions described herein. More specifically, in the illustrative embodiment, the contact center system 102 may be embodied as any system capable of providing contact center services (e.g., including call center services) to an end user and otherwise performing the functions described herein. Depending on the particular embodiment, it should be appreciated that the contact center system 102 may be located on the premises/campus of the organization utilizing the contact center system 102 and/or located remotely relative to the organization (e.g., managed by a third party and/or in a cloud-based computing environment). In some embodiments, a portion of the contact center system 102 may be located on the organization's premises/campus while other portions of the contact center system 102 are located remotely relative to the organization's premises/campus. As such, it should be appreciated that the contact center system 102 may be deployed in equipment dedicated to the organization or third-party service provider thereof and/or deployed in a remote computing environment such as, for example, a private or public cloud environment with infrastructure for supporting multiple contact centers for multiple enterprises. In some embodiments, the contact center system 102 includes resources (e.g., personnel, computers, and telecommunication equipment) to enable delivery of services via telephone and/or other communication mechanisms. Such services may include, for example, technical support, help desk support, emergency response, and/or other contact center services depending on the particular type of contact center.

As shown in FIG. 1, the illustrative contact center system 102 includes a plurality of application servers 112 and a temporary deployment server 114. It should be appreciated that each of the application servers 112 may be embodied as a server or other type of computing device capable of executing one or more applications identified by the deployment package for operation of the contact center system 102. In some embodiments, the temporary deployment server 114 is a server or computing device utilized as an "appliance" or temporary deployment device/system for the application servers 112. For example, in some embodiments, the temporary deployment server 114 may be "pre-built" to include a pre-defined image (e.g., a particular Linux image) for installation of deployment tools, which allows the temporary deployment server 114 to receive the deployment package and leverage the deployment package for the proper installation and configuration of software across the various application servers 112. In some embodiments, after the successful installation and configuration of the contact center software suite to the application servers 112, the temporary deployment server 114 may be decommissioned (e.g., by deleting the previously loaded image). Although the application servers 112 and the temporary deployment server 114 may be described herein as physical servers, it should be appreciated that one or more of the servers 112, 114 may be embodied as virtual servers and/or virtual components (e.g., in a distributed/cloud computing environment) in other embodiments. Additionally, although the contact center system 102 is primarily described as an on-premises contact center system, it should be appreciated that similar techniques may be employed for the configuration and deployment of a contact center system within a cloud-based infrastructure (e.g., public cloud or private cloud).

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic (e.g., such as hypertext transfer protocol (HTTP) traffic and hypertext markup language (HTML) traffic), and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106, 108 of the system 100. It should be appreciated that the various devices/systems 102, 106, 108 may communicate with one another via different networks 104 depending on the source and/or destination devices 102, 106, 108. Further, in some embodiments, one or more of the devices/systems 102, 106, 108 may not be configured to communicate with another of the devices/systems 102, 106, 108 via the network 104.

The cloud server 106 may be embodied as a cloud-based server or other type of computing device capable of performing the functions described herein. For example, in some embodiments, the cloud server 106 is configured to determine the relevant information for generation of the deployment package and generate the deployment package accordingly. Although the cloud server 106 is described herein in the singular, it should be appreciated that the cloud server 106 may be embodied as or include multiple servers in some embodiments. Further, although the cloud server 106 is described herein as a cloud-based server, it should be appreciated that the server 106 may be embodied as one or more servers residing outside of a cloud computing environment in other embodiments.

In cloud-based embodiments, the cloud server(s) 106 may be embodied as a server-ambiguous computing solution, for example, that executes a plurality of instructions on-demand, contains logic to execute instructions only when prompted by a particular activity/trigger, and does not consume computing resources when not in use. That is, server(s) 106 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the server(s) 106 described herein. For example, when an event occurs (e.g., data is transferred to the relevant server 106 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the server 106), the appropriate virtual function(s) may be executed to perform the actions before eliminating the instance of the virtual function(s).

The user device 108 may be embodied as any type of device capable of executing an application and otherwise performing the functions described herein. For example, in some embodiments, the user device 108 is configured to execute an application to access a graphical user interface (e.g., the graphical user interface 500 of FIGS. 5-27), which permits the user to interact with the cloud server 106 for generation of the deployment package and/or otherwise as described herein. It should be appreciated that the application may be embodied as any type of application suitable for performing the functions described herein. In particular, in some embodiments, the application may be embodied as a mobile application (e.g., a smartphone application), a cloud-based application, a web application, a thin-client application, and/or another type of application. For example, in some embodiments, application may serve as a client-side interface (e.g., via a web browser) for a web-based application or service.

It should be appreciated that each of the contact center system 102, the cloud server 106, the user device 108, the application servers 112, and the temporary deployment server 114 may be embodied as (or include) one or more computing devices similar to the computing device 200 described below in reference to FIG. 2. For example, in the illustrative embodiment, each of the contact center system 102, the cloud server 106, the user device 108, the application servers 112, and the temporary deployment server 114 may include a processing device 202 and a memory 206 having stored thereon operating logic 208 (e.g., a plurality of instructions) for execution by the processing device 202 for operation of the corresponding device.

Figure 2:
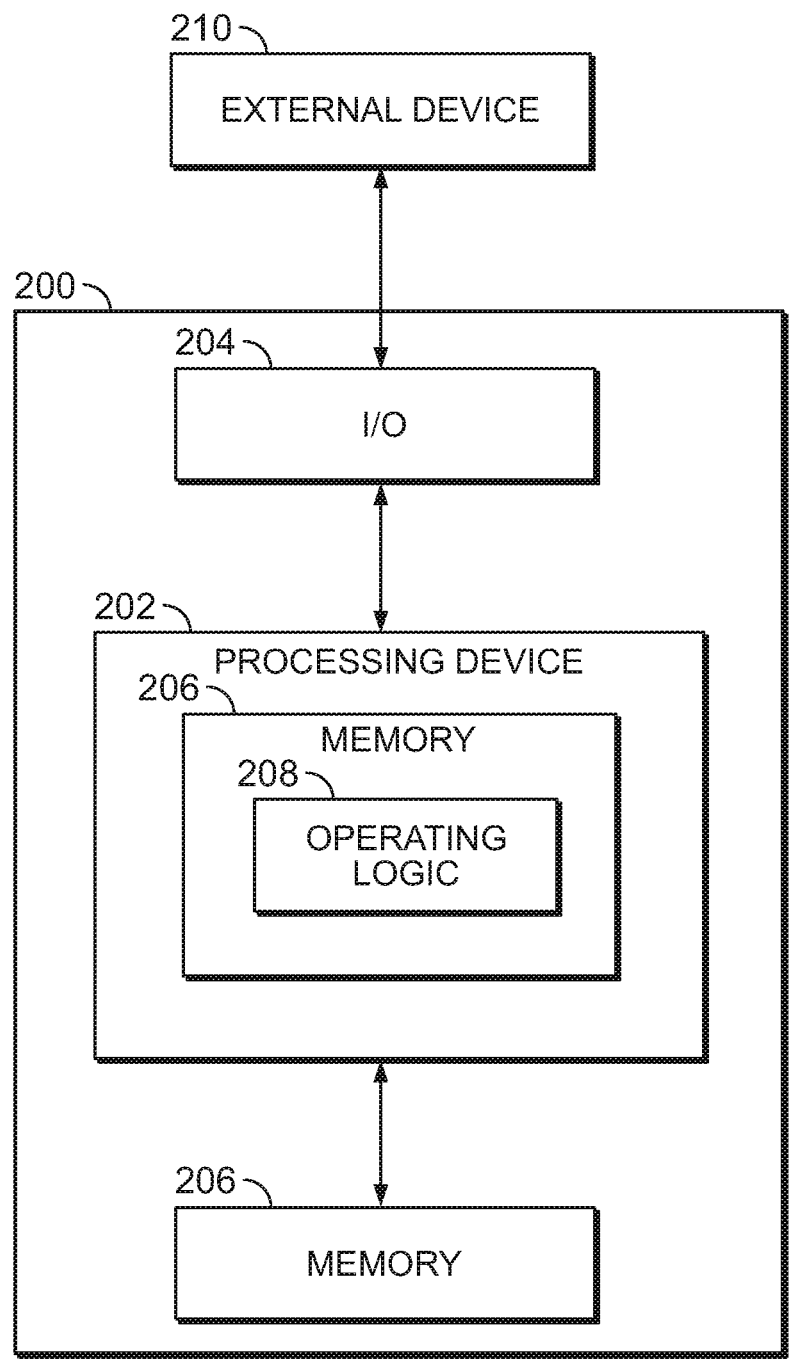
FIG. 2 is a simplified block diagram of at least one embodiment of a computing device.

Referring now to FIG. 2, a simplified block diagram of at least one embodiment of a computing device 200 is shown. The illustrative computing device 200 depicts at least one embodiment of a contact center system, server, user device, and/or computing device that may be utilized in connection with the contact center system 102, the cloud server 106, the user device 108, the application servers 112, and/or the temporary deployment server 114 illustrated in FIG. 1. Depending on the particular embodiment, the computing device 200 may be embodied as a server, desktop computer, laptop computer, tablet computer, notebook, netbook, Ultrabook™ cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the contact center system 102, the cloud server 106, the user device 108, the application servers 112, and/or the temporary deployment server 114. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
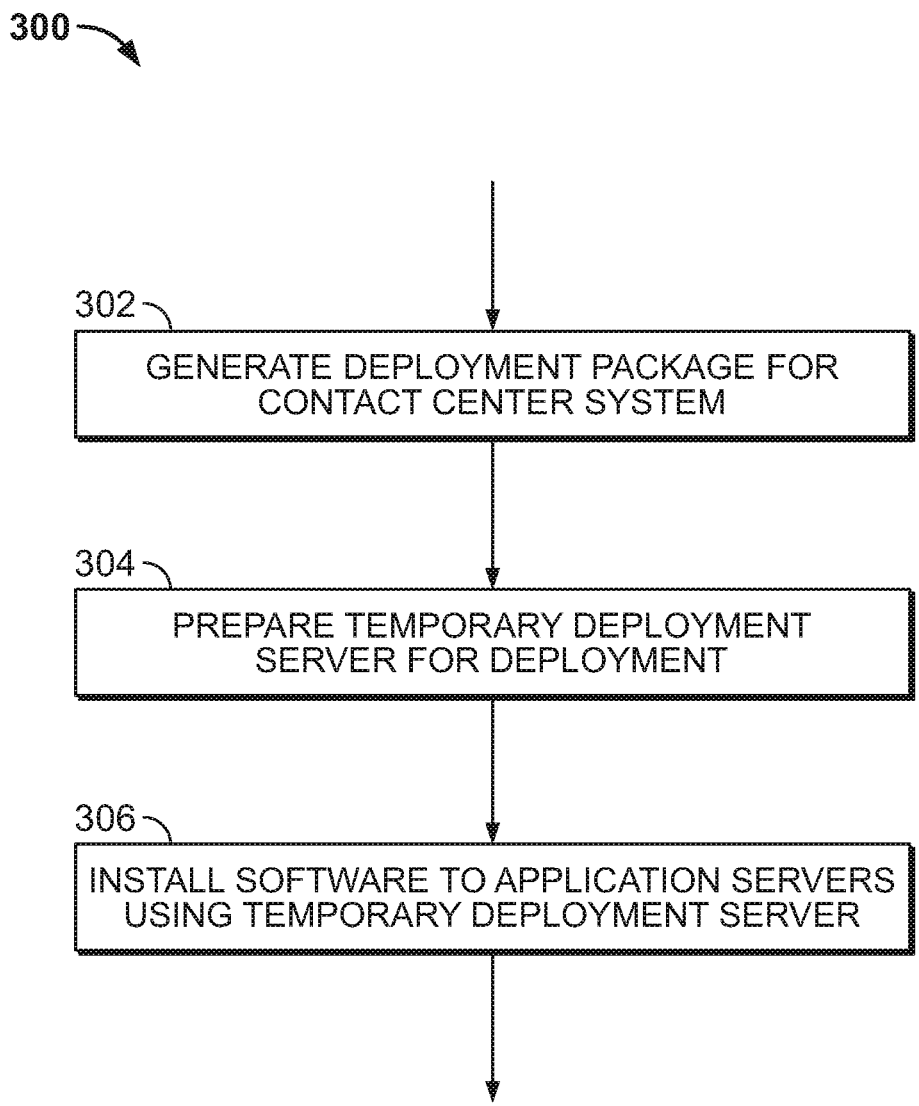
FIG. 3 is a simplified flow diagram of at least one embodiment of a method for the automated deployment of application servers in a contact center system.

Referring now to FIG. 3, in use, the system 100 may execute a method 300 for the automated deployment of application servers 112 in the contact center system 102. It should be appreciated that the particular blocks of the method 300 are illustrated by way of example, and such blocks may be combined or divided, added or removed, and/or reordered in whole or in part depending on the particular embodiment, unless stated to the contrary. The illustrative method 300 begins with block 302 in which the system 100 generates a deployment package for the application servers 112. In some embodiments, the system 100 may execute the method 400 of FIG. 4 to do so.

Figure 4:
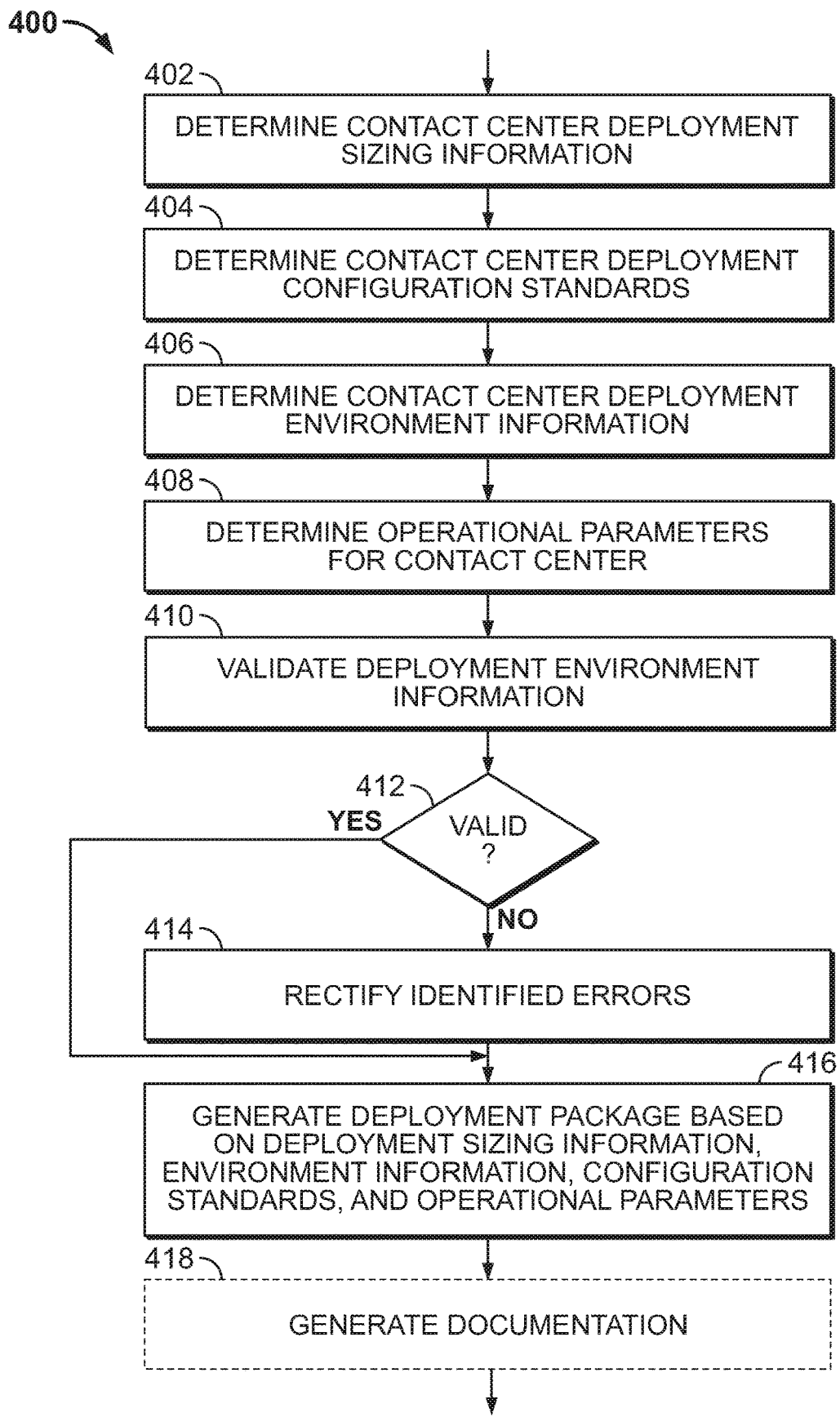
FIG. 4 is a simplified flow diagram of at least one embodiment of a method for generating a deployment package for the contact center system.
Figure 7:
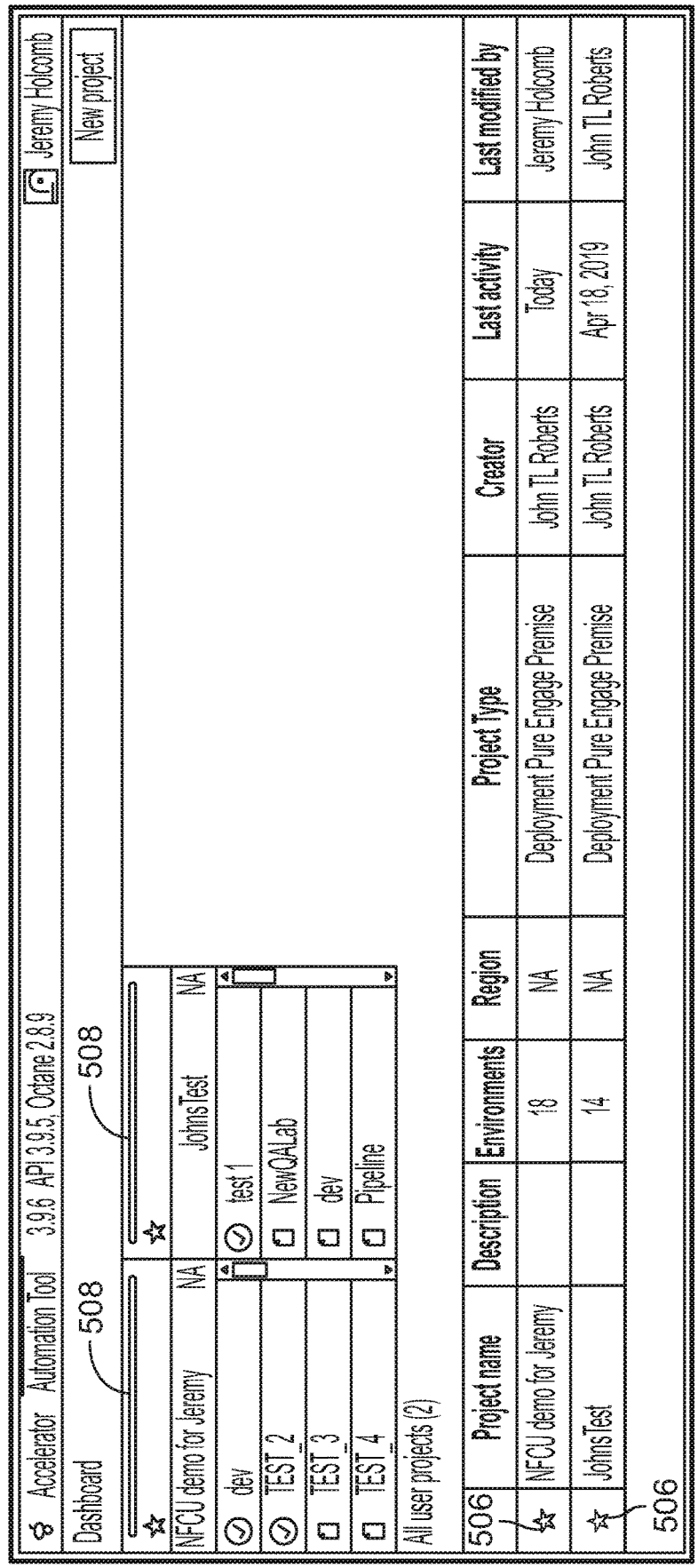
Figure 10:
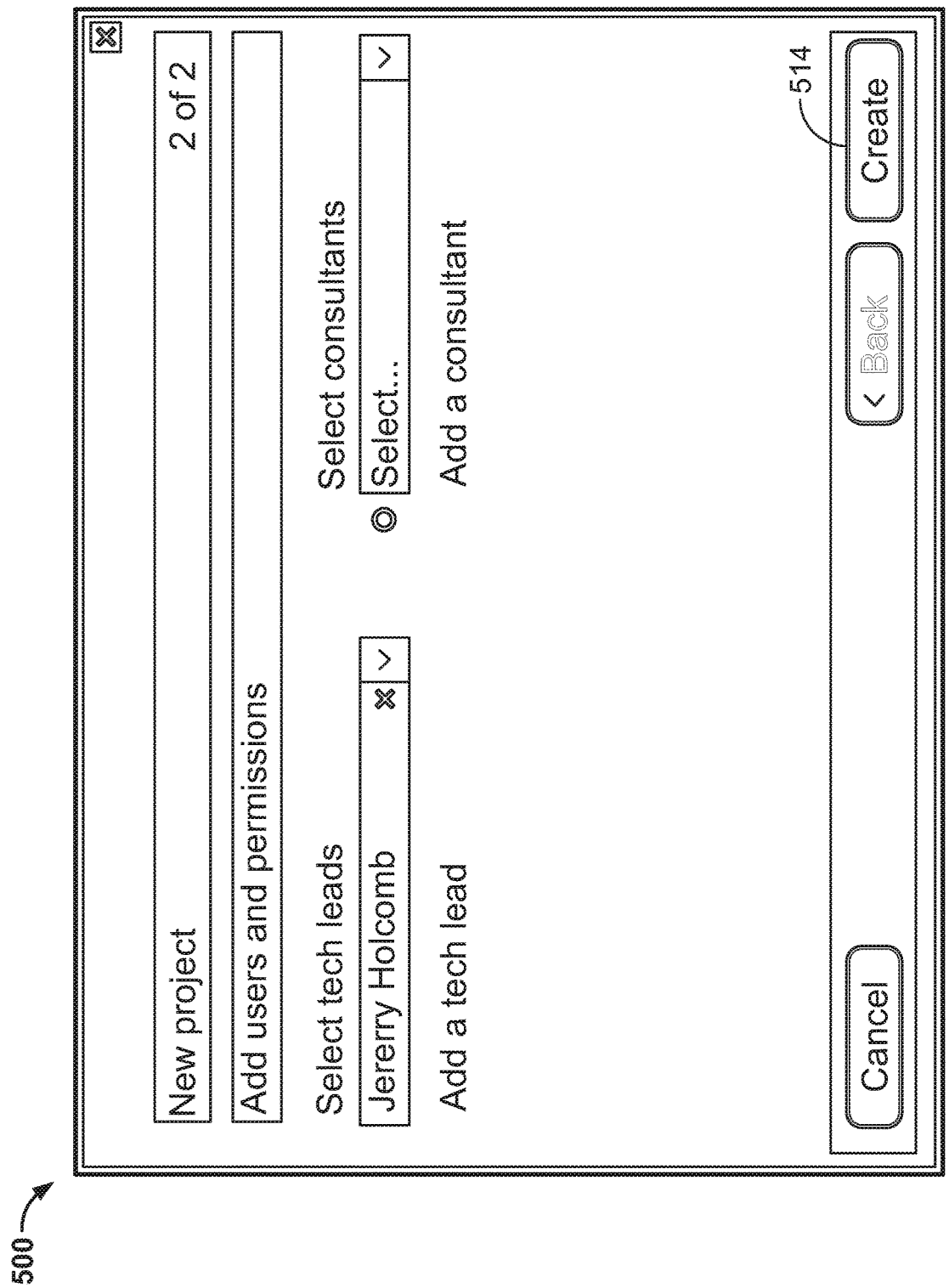

Referring now to FIG. 4, in use, the system 100 may execute a method 400 for generating a deployment package for the contact center system 102. It should be appreciated that the particular blocks of the method 400 are illustrated by way of example, and such blocks may be combined or divided, added or removed, and/or reordered in whole or in part depending on the particular embodiment, unless stated to the contrary. The illustrative method 400 begins with block 402 in which the system 100 (e.g., the cloud server 106) determines deployment sizing information for the contact center system 102 installation. For example, the system 100 may determine the number/size of application servers 112 and the application(s) to be installed on the various application servers 112 (e.g., identifying which application(s) are to be installed on each server 112). Depending on the particular embodiment, it should be appreciated that the deployment sizing information for the contact center system 102 may be previously determined and transmitted/provided to the system 100 or calculated by the contact center system 102 itself (e.g., based on user inputs associated with the various anticipated needs of the contact center system 102). In some embodiments, the deployment sizing information includes an estimate of the number of components, virtual machines, ESX servers or hypervisors, processor utilization, memory utilization, input/output operations per second (IOPS), database utilization, and/or other anticipated resource utilizations of the contact center system 102 (e.g., based on user input by the user device 108 or other device, historical data, machine learning, and/or other techniques).

In some embodiments, the deployment sizing information may be based on various user-supplied or otherwise determined inputs including, for example, server/ESX/hypervisor parameters (e.g., physical cores, memory, CPU score, hyper threading, max VM cores over-commitment, number of chips, maximum read IOPS, maximum write TOPS, etc.), historical or anticipated contact center interaction data (e.g., total number of agents, number of ConfServer clients, number of StatServer clients, number of SIP server monitoring clients, number of Interaction server clients, re-login time, number of interaction server reporting clients, number of active interactions (e.g., email, working items, chats, etc.), rate of find/identify contact requests, rate of create contact requests, rate of interactions, rate of add/update/delete interactions, search request rate, total contacts, percentage of new contacts, contact record size, etc.), inbound voice services (number of agents, peak call rate, calls per day, agent utilization percentage, queue time, etc.), outbound voice services (number of agents, outbound dial rate, outbound hit rate, agent utilization percentage, talk time, etc.), voice callback services (e.g., number of agents, agent utilization percentage, talk time, etc.), chat services, email services, Open Media services, iWD services, GWE services, GCB services, SMS services, screening and classification services, Pulse services, recording services, GWS services, information derived from any of the parameters provided above, and/or other relevant deployment sizing information.

In block 404, the system 100 (e.g., the cloud server 106) determines contact center deployment configuration standards applicable to the contact center system 102. In some embodiments, the contact center deployment configuration standards may include a set of "best practices" for contact center deployment. In particular, in some embodiments, the contact center deployment configuration standards may be embodied as or include one or more "feature packs," context-aware configuration rulesets, and/or templates that define the low level configurations that allow various applications to function and the various interdependencies between applications (e.g., and capable of being deployed automatically when the environment is created). For example, it should be appreciated that certain applications are interdependent upon one another in that the operation of one application is dependent on the proper installation and configuration of another application. Depending on the particular embodiment, it should be appreciated that the contact center deployment configuration standards may be static or dynamic (e.g., updated over time). For example, in some embodiments, the system 100 may leverage one or more machine learning and/or artificial intelligence techniques to determine and/or update the contact center deployment configuration standards over time. For example, in some embodiments, the system 100 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms, artificial intelligence, and/or other suitable machine learning algorithms, artificial intelligence algorithms, techniques, and/or mechanisms.

In block 406, the system 100 (e.g., the cloud server 106) determines environment information associated with the contact center system 102. In some embodiments, the environment information may include, for example, the particular server/host names and addresses (e.g., of the physical servers) to be used in the deployment, directories to which to install the various applications and store the relevant data, IP addresses of the servers, database information, credentials for accessing relevant databases and other devices/components, usernames and passwords, and/or other environment-specification information associated with the contact center system 102. In some embodiments, the system 100 may generate documentation based on the deployment sizing information, and the documentation may be provided to an administrator of the contact center system 102 to provide the various environment information as described below. For example, in some embodiments, the administrator may "check off" the various servers as they are created and provide the relevant environment information. In other embodiments, the user device 108 may provide the environment information via a graphical user interface (e.g., the graphical user interface 500 of FIGS. 5-27).

In block 408, the system 100 (e.g., the cloud server 106) determines operational parameters (e.g., GAX parameters) for the installation of the contact center system 102. In some embodiments, the operational parameters may include various parameters and/or configurations specific to the contact center that affect the manner in which the contact center system 102 operates. For example, the operational parameters may include open hours for a particular queue or group of individuals, a special flag to be set if a building is evacuated (e.g., due to a fire), and/or other operational parameters. In some embodiments, it should be appreciated that the operational parameters may be specific to the routing application being used, which may be preloaded by virtue of the techniques described herein. In some embodiments, the user device 108 may provide the operational parameters via a graphical user interface (e.g., the graphical user interface 500 of FIGS. 5-27).

In block 410, the system 100 (e.g., the cloud server 106) validates the deployment environment information and/or other data used in generating the deployment package to ensure that the information is valid/accurate. In doing so, the system 100 may leverage a set of rules applicable to the configuration, which may ensure various data were entered correctly, any substitutions were proper, and/or other rules were satisfied. Further, in some embodiments, the system 100 may confirm that any servers and/or other devices referenced by the deployment environment information actually exist and various other provided information is accurate (e.g., resource addresses, usernames, passwords, credentials, etc.). The system 100 may utilize any suitable techniques and/or algorithms for validating the deployment environment information and/or other relevant information.

If the deployment environment information is determined to be invalid (e.g. have one or more errors) in block 412, the method 400 advances to block 414 in which the system 100 rectifies (or attempts to rectify) the identified errors. For example, the system 100 may prompt a user (e.g., via the user device 108) to provide accurate data to replace the identified erroneous data (e.g., a particular server address identified as being inaccurate). If the deployment environment information is determined to be valid in block 412, or subsequent to rectifying any identified errors and revalidating, the method 400 advances to block 416 in which the system 100 (e.g., the cloud server 106) generates the deployment package based on the contact center deployment sizing information, contact center deployment configuration standards, contact center deployment environment information, operational parameters for the contact center system 102, and/or other configuration factors. It should be appreciated that operational parameters and/or other factors described herein may be ignored in generating the deployment package in some embodiments.

In some embodiments, the deployment package may include the various configuration information that is going to be provided to the temporary deployment server 114 or other appliance for the deployment of the application servers 112. In particular, the deployment package may include the full suite of configuration data, metadata, and interlinking data between the various applications to be provisioned to the application servers 112. In some embodiments, a "cookbook" consumes information from the deployment package to execute the functions of a Chef server. In other embodiments, however, it should be appreciated that the deployment package may be used in conjunction with a different type of infrastructure deployment server, system, and/or code. Regardless of the particular infrastructure deployment server, system, and/or code being used, for each application to be installed, the deployment package may provide the system 100 with the server name/address to which the application is to be installed, username and password required to login to that server, directory to which the application is to be installed, and/or other information relevant to the application installation.

In block 418, the system 100 (e.g., the cloud server 106) may generate documentation (e.g., automatically) based on the deployment package and/or other data described herein. In some embodiments, users of the user device 108 may create templates for various document types (e.g., a technical design specification) via a graphical user interface (e.g., the graphical user interface 500 of FIGS. 5-27), which may be used to generate documents of that type and import the relevant technical information from the deployment package. For example, in some embodiments, the system 100 may automatically generate documentation requesting the various deployment environment information for the particular contact center system 102. In other embodiments, the system 100 may automatically generate user prompts for that data rather than documentation.

Although the blocks 402-418 are described in a relatively serial manner, it should be appreciated that various blocks of the method 400 may be performed in parallel in some embodiments.

Referring back to FIG. 3, in block 304, the system 100 prepares the temporary deployment server 114 for deployment of software to the application servers 112 and, in block 306, the system 100 installs the relevant software to the application servers 112 using the temporary deployment server 114. As described above, in some embodiments, the deployment package may be "fed" into an appliance (e.g., the temporary deployment server 114 or other temporary deployment device/system) for deployment of that appliance, which may include Chef server and/or another suitable infrastructure-as-a-service or infrastructure deployment code/system that parses the information in the deployment package. As such, the various configurations may be loaded into the appliance (e.g. the temporary deployment server 114). Further, the deployment package may provide the information needed to bootstrap each of the application servers 112, install the relevant servers and applications, and perform any post-installation and environment-readiness work (e.g., creating log directories, etc.).

Although the blocks 302-306 are described in a relatively serial manner, it should be appreciated that various blocks of the method 300 may be performed in parallel in some embodiments.

FIGS. 5-27 illustrate various possible states of a graphical user interface 500 accessed by a user of the user device 108 for generation of the deployment package for the contact center system 102 as described above.

As shown in FIG. 5, the illustrative graphical user interface 500 may display a list of active contact center system projects 502. It should be appreciated that multiple environments 504 may be created within a particular project. For example, a particular organization may desire to employ multiple environments (e.g., a development environment, a QA environment, a production environment, and/or other environments) in which case the user may create those separate environments within one of the listed projects after having created the project. Selecting one of the projects identified in the graphical user interface 500 of FIG. 5 displays the various environments that have been created for that particular project (see FIG. 6). Further, in some embodiments, an icon 506 next to one of the projects (see FIG. 5) may be selected to mark that project as a "favorite," which results in the presentation of a "card" 508 showing the environments within the project (see FIG. 7).

As shown in FIG. 8, a "new project" button 510 of the graphical user interface 500 may be selected to create a new project, which launches a "new project" dialog (see FIG. 9). As shown, in the illustrative embodiment, the "new project" dialog of FIG. 9 prompts the user for a project name, region, type, and description. After clicking the "next" button 512, the second screen of the dialog prompts the user to add users and permissions for the project (see FIG. 10). In particular, in the illustrative embodiment, the user may be prompted to select the technical leads and/or consultants that will be provided access to the project. In some embodiments, the technical lead may be the person with the ultimate authority regarding any environmental changes. The project may be completed by selecting the "create" button 514 (see FIG. 10). After a project has been created, a new environment can be created by selecting the "new environment" button 516 (see FIGS. 6 and 11). After all of the required information for the environment has been supplied and the environment has been validated, an icon 518 (e.g., a check mark) may appear next to the environment's name to indicate that the environment has been validated. The user may also select an option 520 to clone, delete, freeze, or document a particular environment. After completing the environment information, the user may be prompted to select the relevant deployment sizing information (e.g., as a JSON file) for the environment to be imported into the system.

Figure 12:
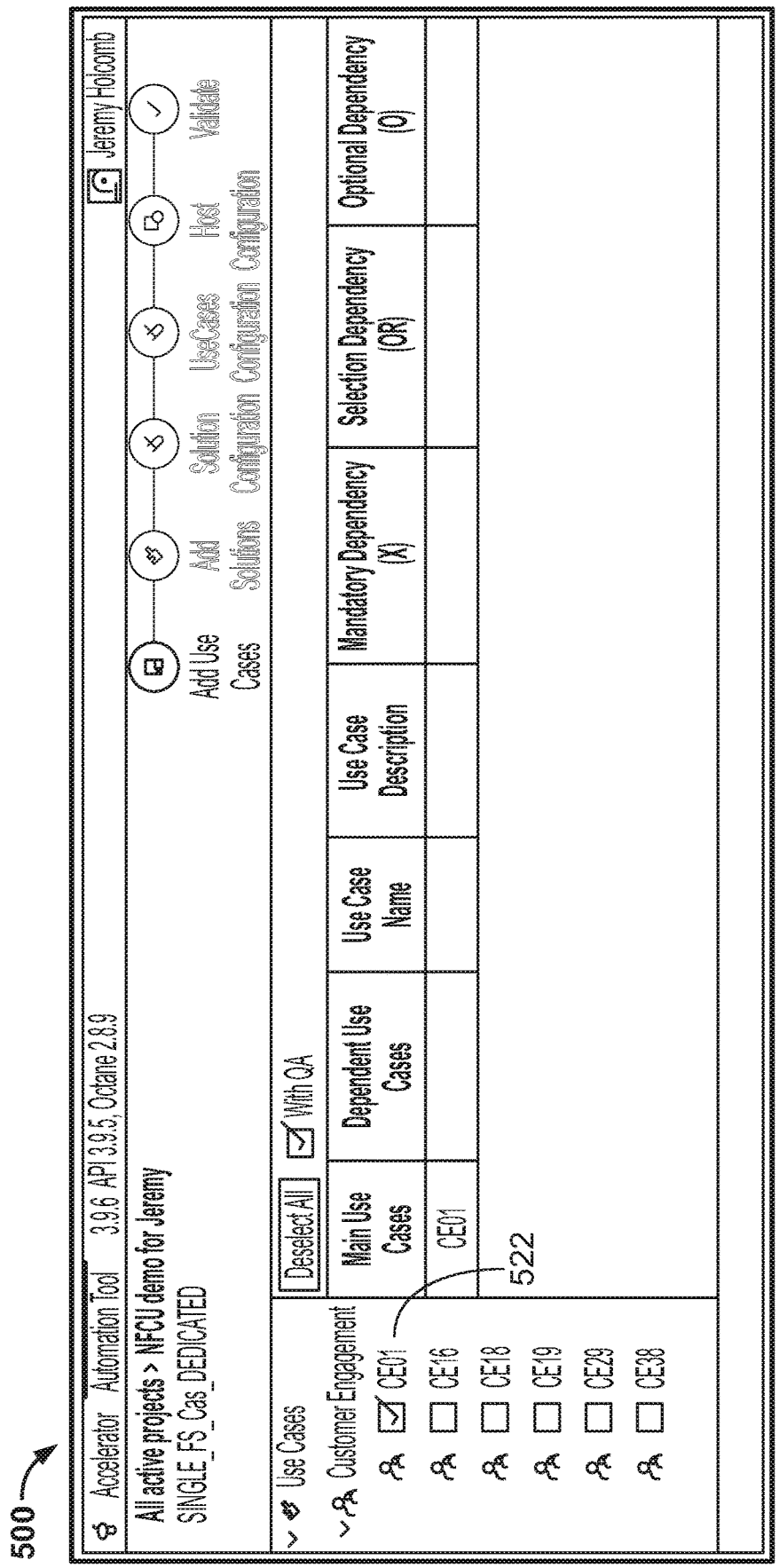
Figure 13:
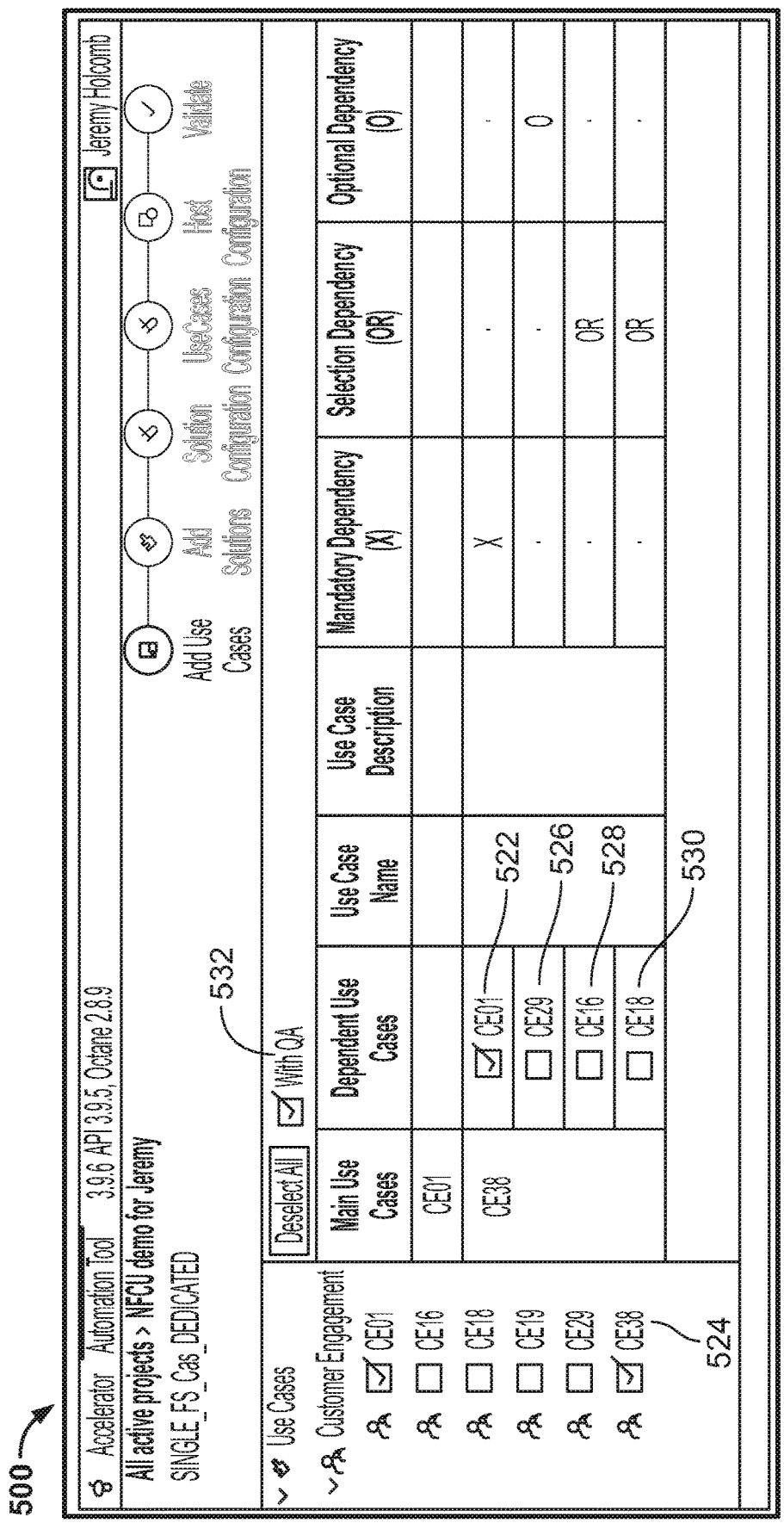

After the deployment sizing information has been imported, the user may configure the environment. For example, the user may optionally add any use cases, which may add the operational parameters and configurations necessary for that particular use case. For example, as shown in FIG. 12, the user has selected the "CE01" use case 522 in the illustrative embodiment. It should be appreciated that some use cases have dependencies on other use cases (e.g., based on the interdependencies of relevant application as described above). Accordingly, selection of a particular use case with a dependency informs the user of that dependency and may indicate whether the dependency is mandatory, selection, or optional. For example, as shown in FIG. 13, the user selects the "CE38" use case 524, which indicates that the "CE01" use case 522 has a mandatory dependency, the "CE29" use case 526 has an optional dependency, and both the "CE16" use case 528 and the "CE18" use case 530 have selection dependency (e.g., indicating that at least one of them is required to be added if the "CE38" use case 524 is added). If the "With QA" option 532 is selected, the system 100 may create QA objects.

Figure 14:
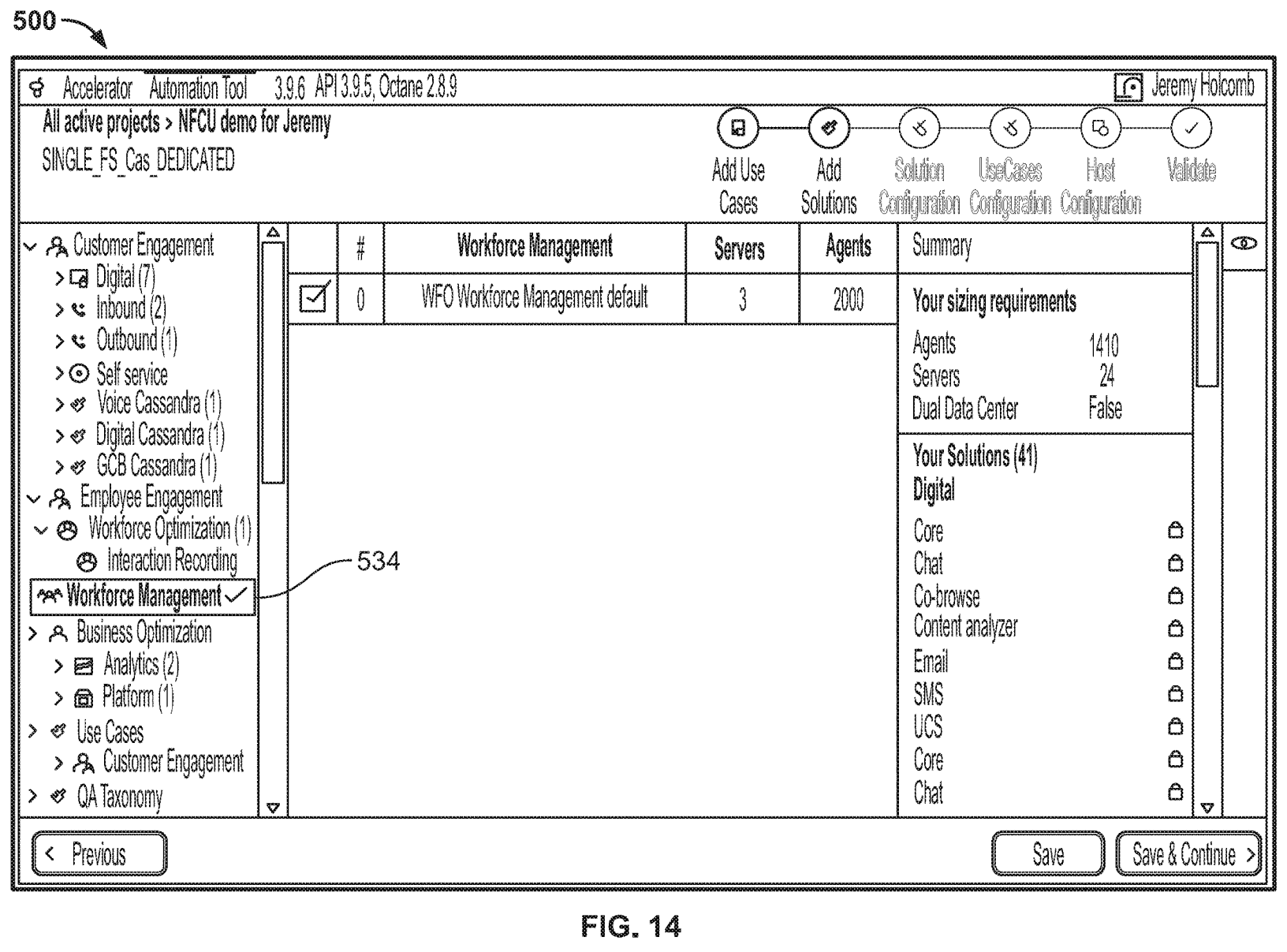

As shown in FIG. 14, the graphical user interface 500 may include a solutions section that provides the user with an opportunity to add solutions that have not already been added to the project. It should be appreciated that some solutions may already be selected based on the deployment sizing information and any use cases that were selected by the user. However, the user may also desire to have further solutions added. For example, in the illustrative embodiment, the user selects the "workforce management" solution 534 to be added. As shown in the illustrative embodiment, selecting the "workforce management" solution 534 increases the number of servers by 3 in the deployment package to accommodate that solution, which is capable of handling up to 2000 agents.

Figure 15:
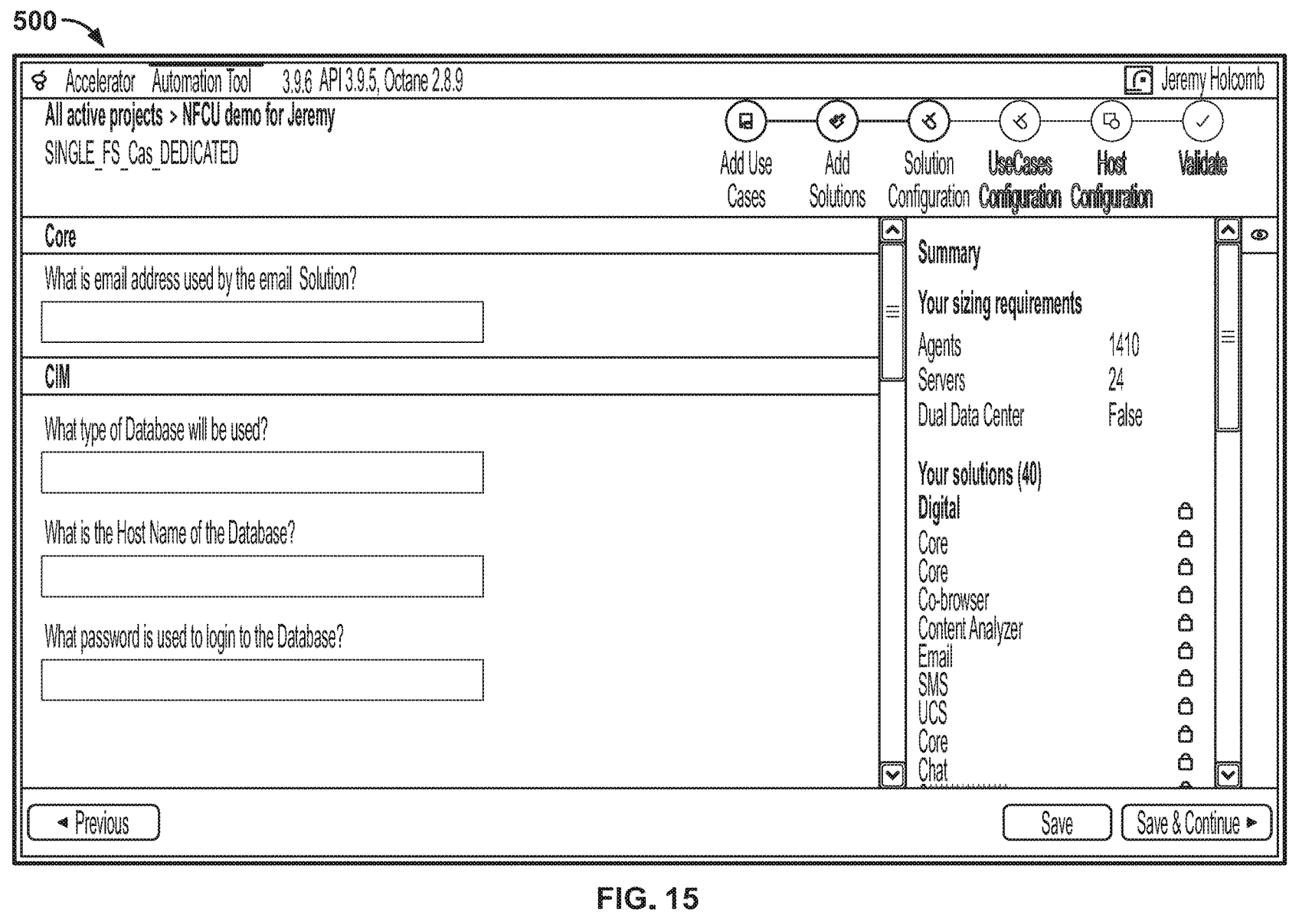
Figure 16:
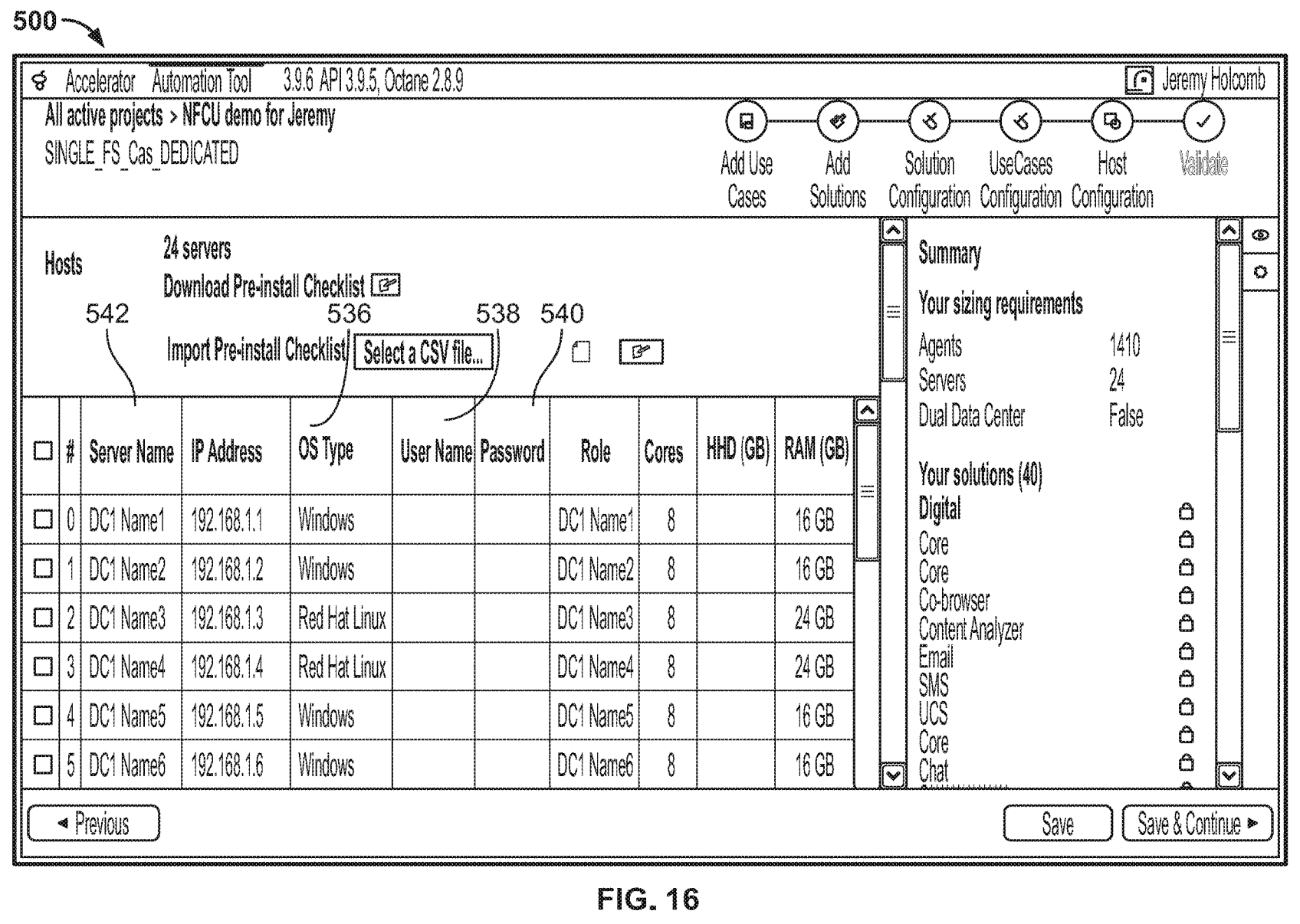
Figure 17:
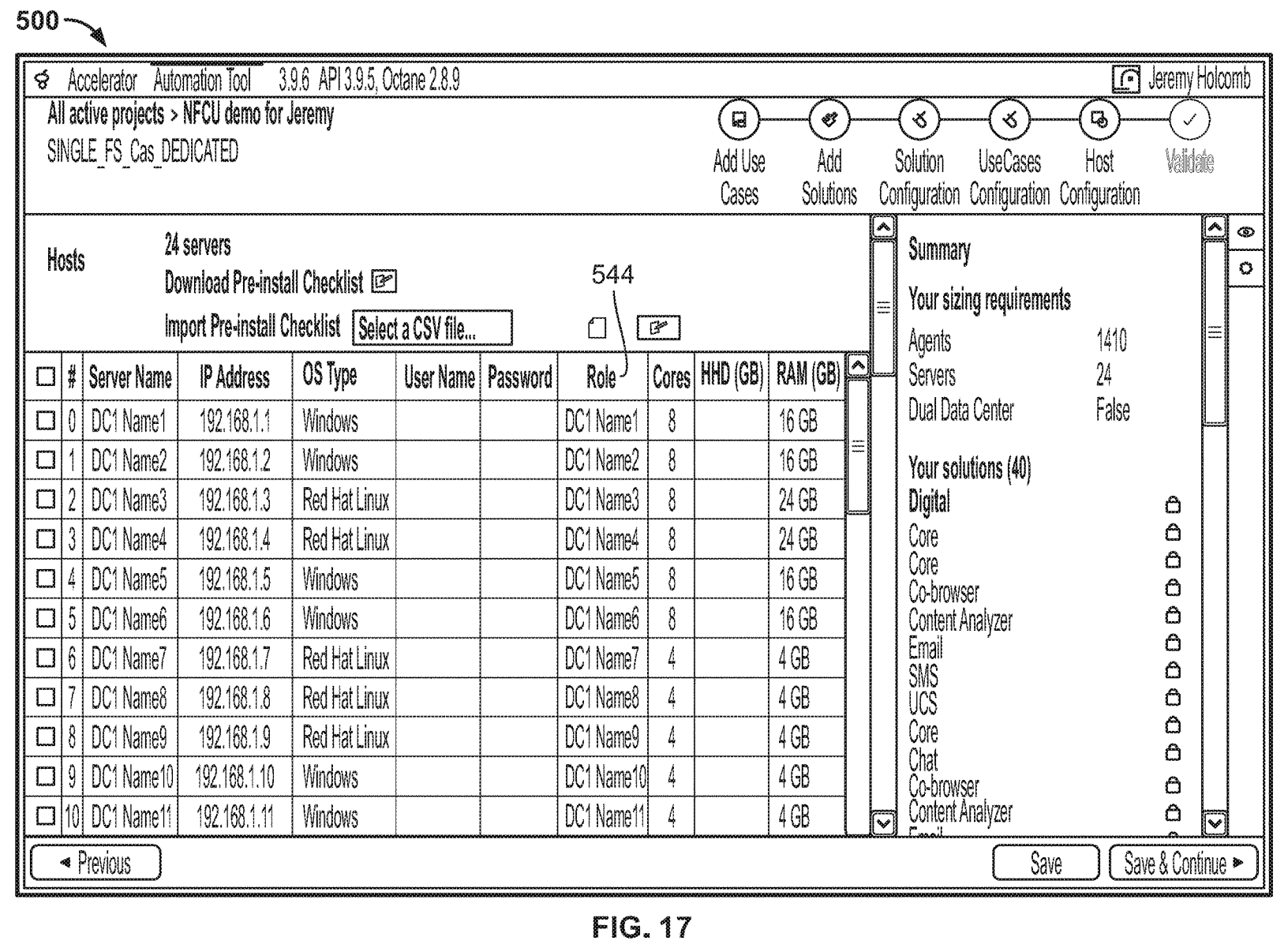

As shown in FIG. 15, the graphical user interface 500 may prompt the user to answer various questions regarding the deployment environment (e.g., the environment information described above) for the contact center system 102. In some embodiments, as shown in FIG. 15, the user may be asked what type of database will be used, the name of the database, and the password for the database. As shown in FIG. 16, the graphical user interface 500 further prompts the user to provide the IP addresses 536, usernames 538, and passwords 540 for the hosts (e.g., the particular physical servers 542). As described above, in some embodiments, the system 100 may generate documentation prompting the administrator of the contact center system 102 to supply the relevant environment information, which may then be provided to the system 100 (e.g., by the technical lead with access to the project). It should be appreciated that the particular inquiries depicted in FIGS. 15-16 are for reference only, and the user may be prompted to supply additional and/or alternative information regarding the deployment environment for the contact center system 102 in other embodiments. As shown in FIG. 17, the role 544 of a particular host/server may be used as a key during the import process to match the server names to the actual server in the database.

Figure 18:
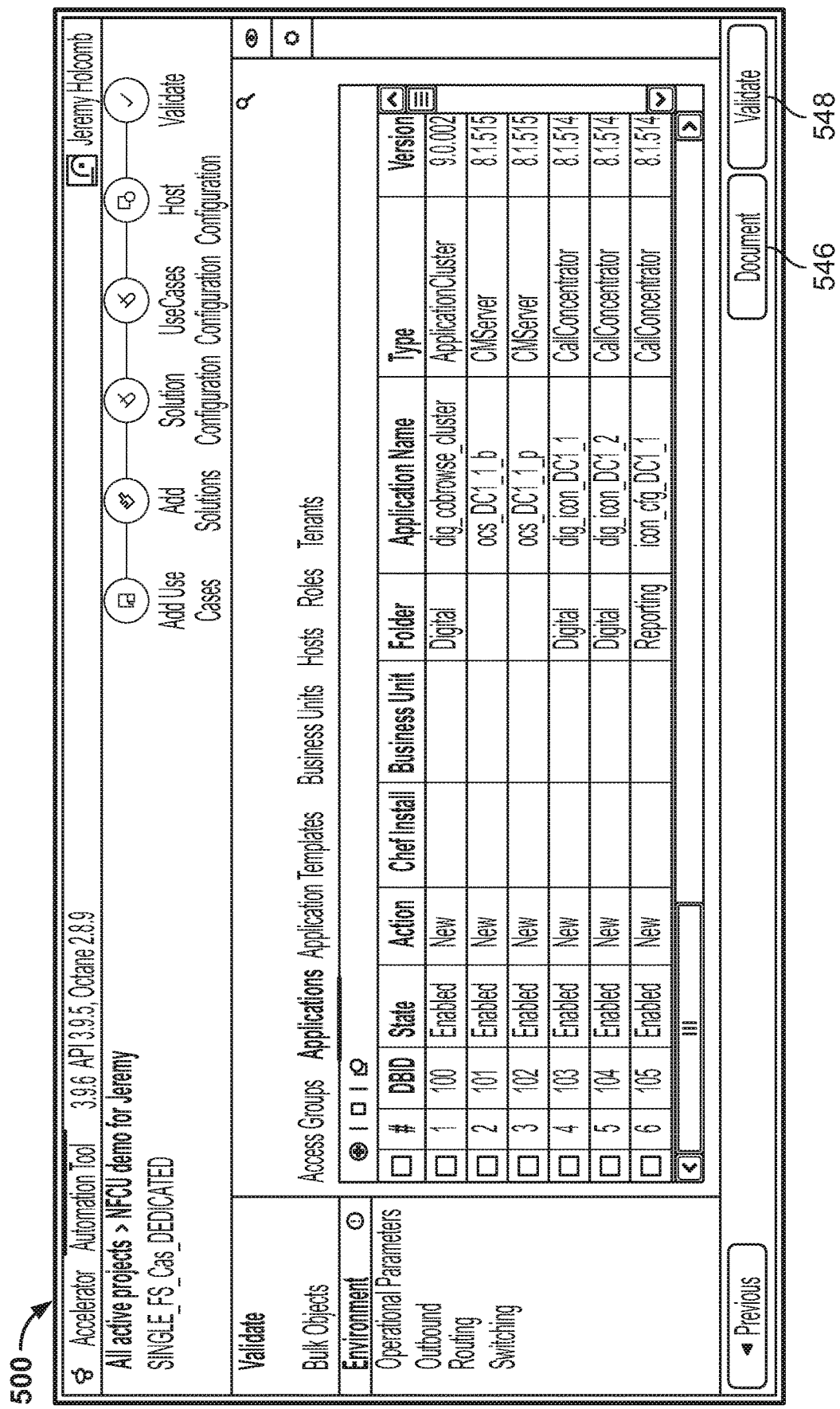
Figure 19:
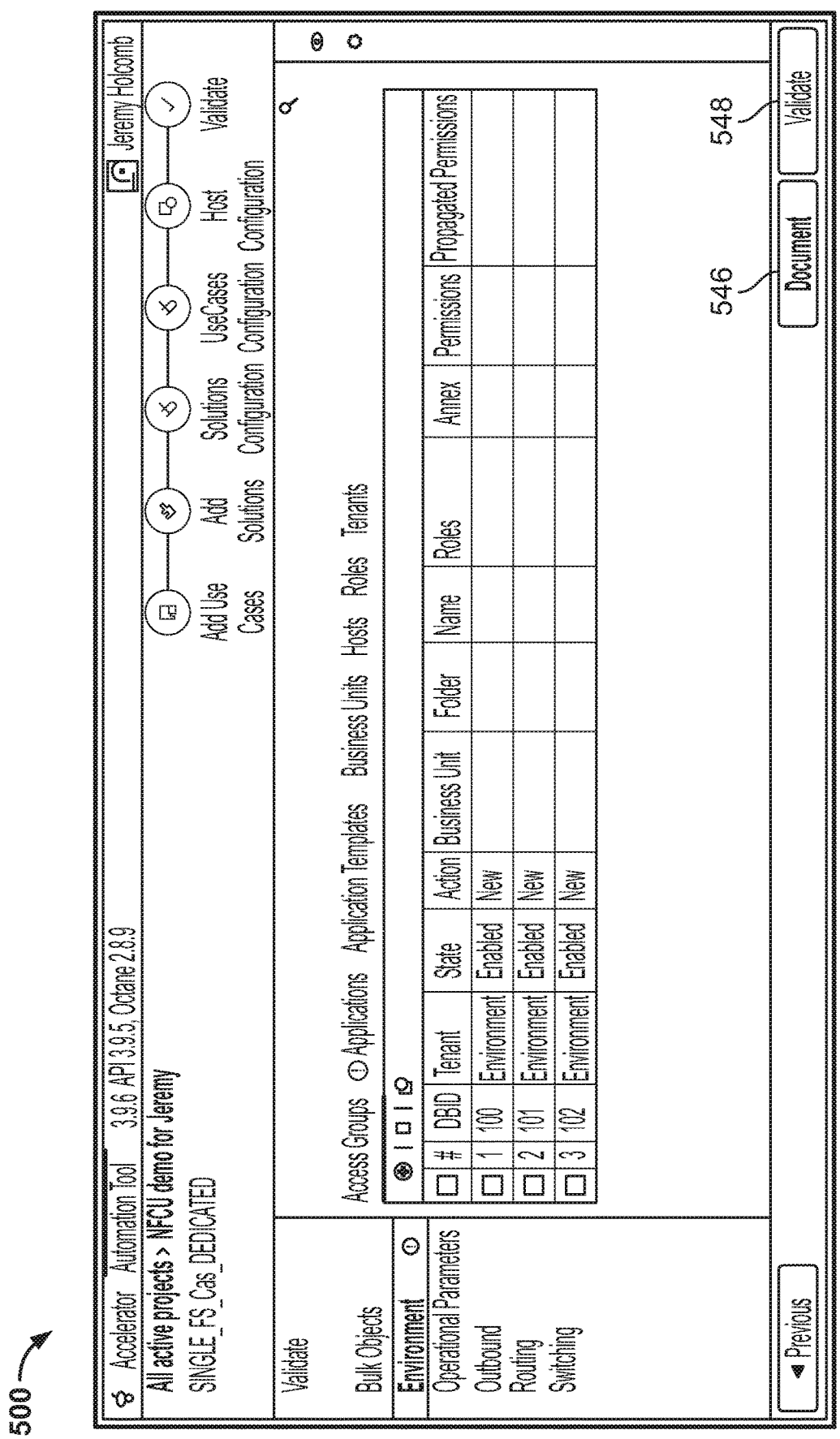
Figure 20:
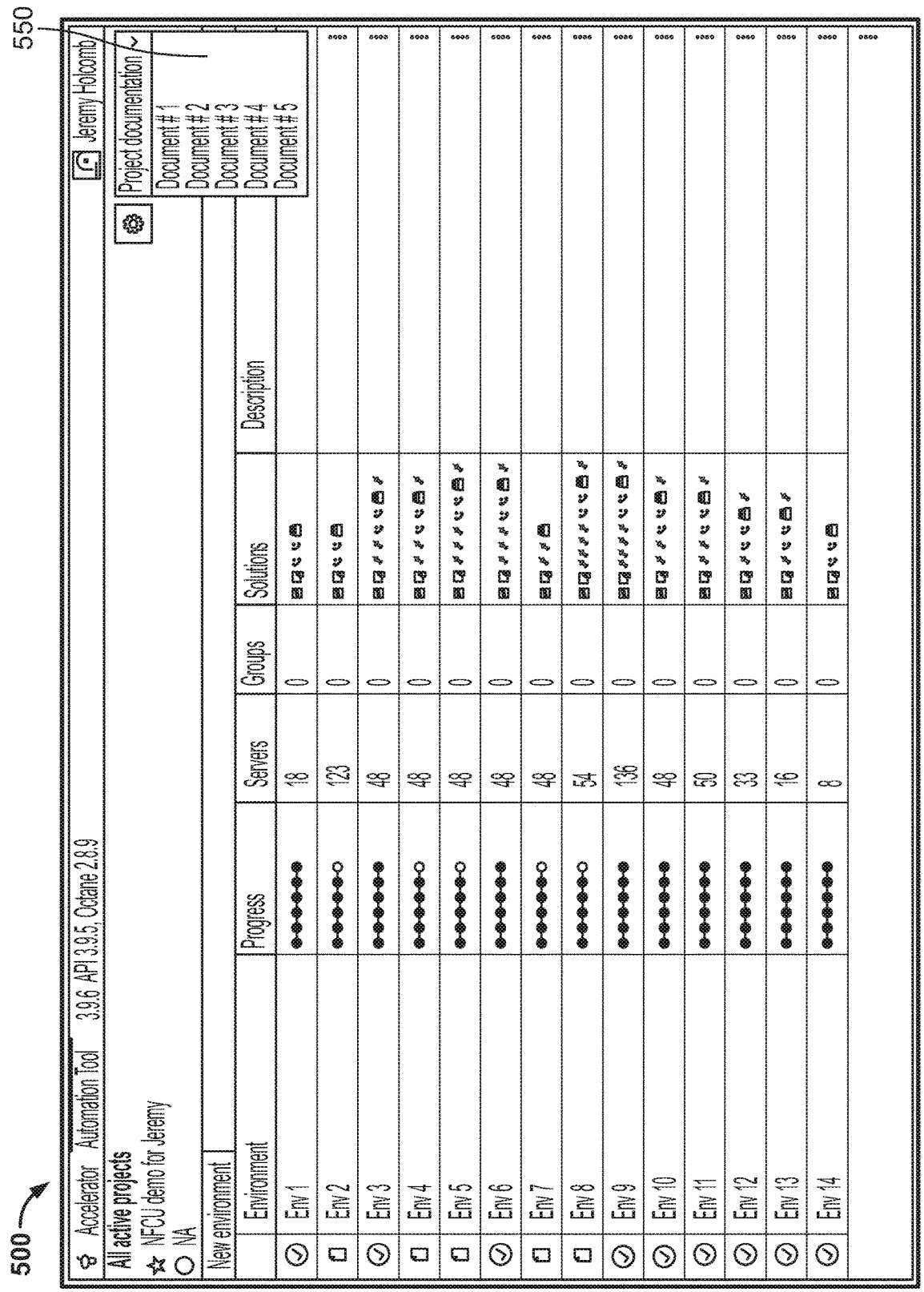

After the deployment environment information has been provided, the system 100 may begin to build the deployment package for review. Accordingly, the information may be committed to the database, and the "feature packs" described above may be applied to the information to generate the deployment package. After the deployment package has been created, as shown in FIG. 18, the graphical user interface 500 may provide a representation of the environment to permit the user to make any final changes. As shown, the user may select the "document" button 546 to create a document based on a document template (see FIG. 19) or the "validate" button 548 to validate the environment information as described above. It should be appreciated that the templates may utilize tags to import environment information from the system 100 (e.g., from the deployment package). As shown in FIG. 20, the graphical user interface 500 may provide links 550 to download the relevant project documentation.

Figure 21:
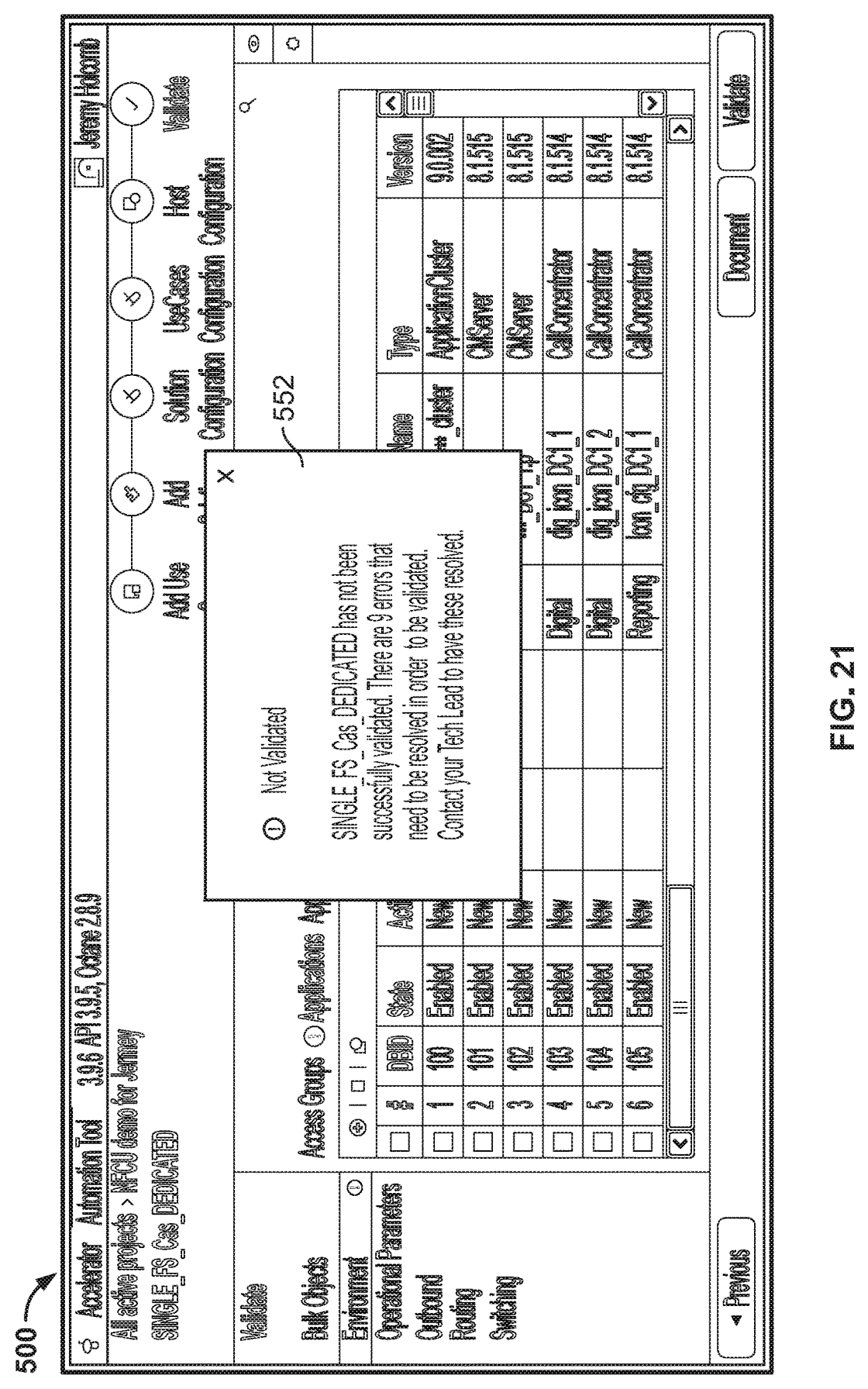
Figure 22:
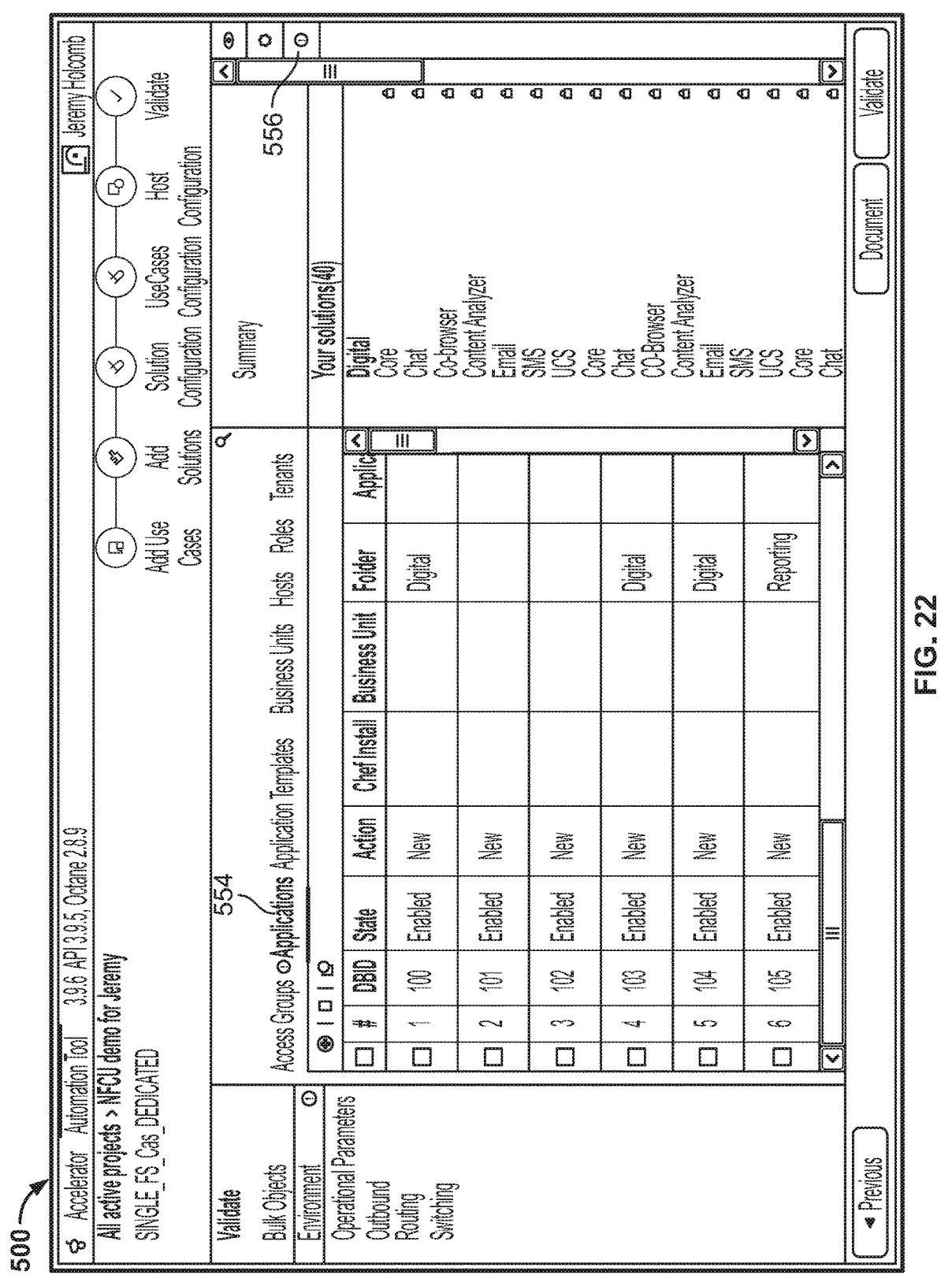
Figure 23:
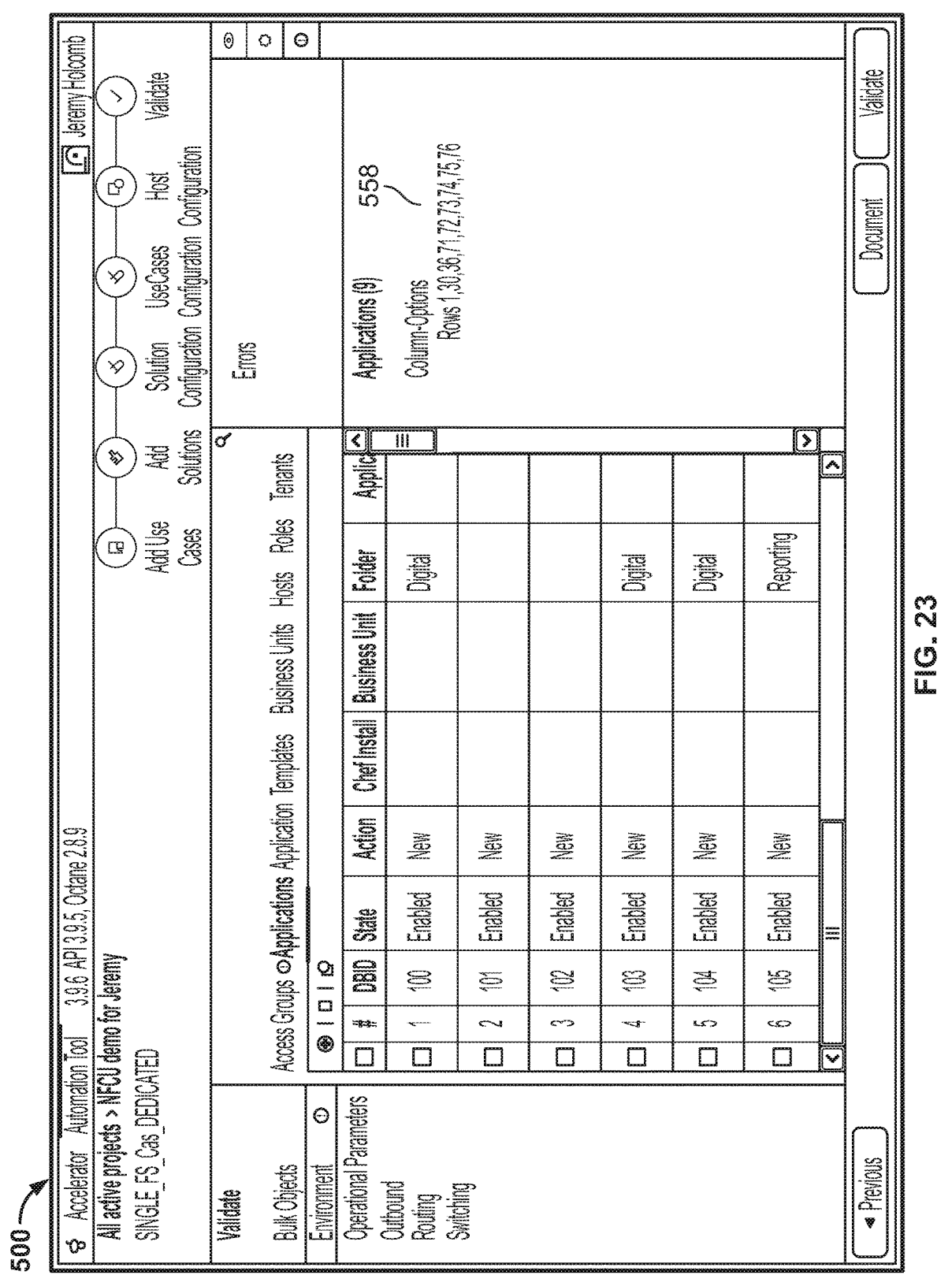
Figure 24:
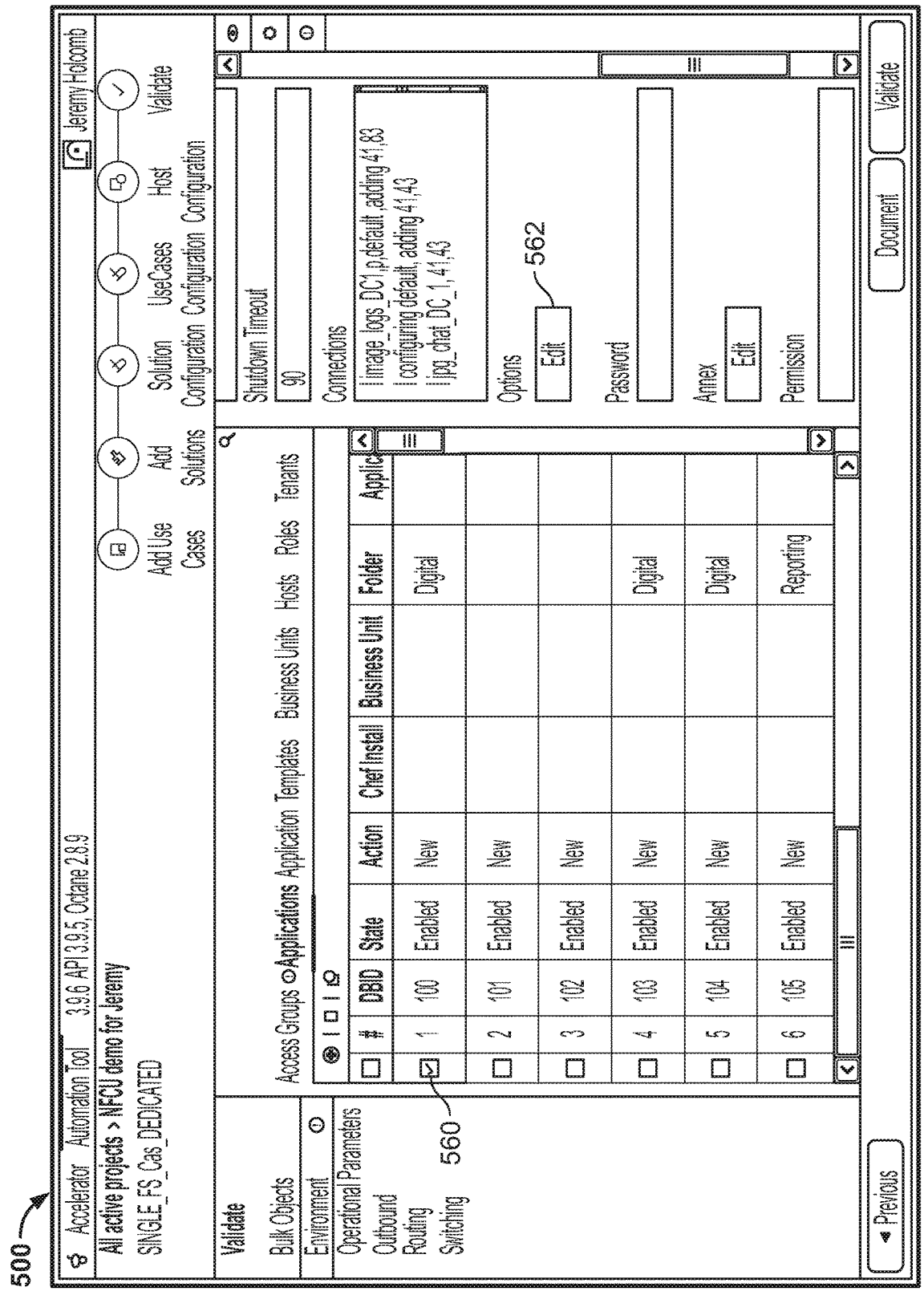
Figure 25:
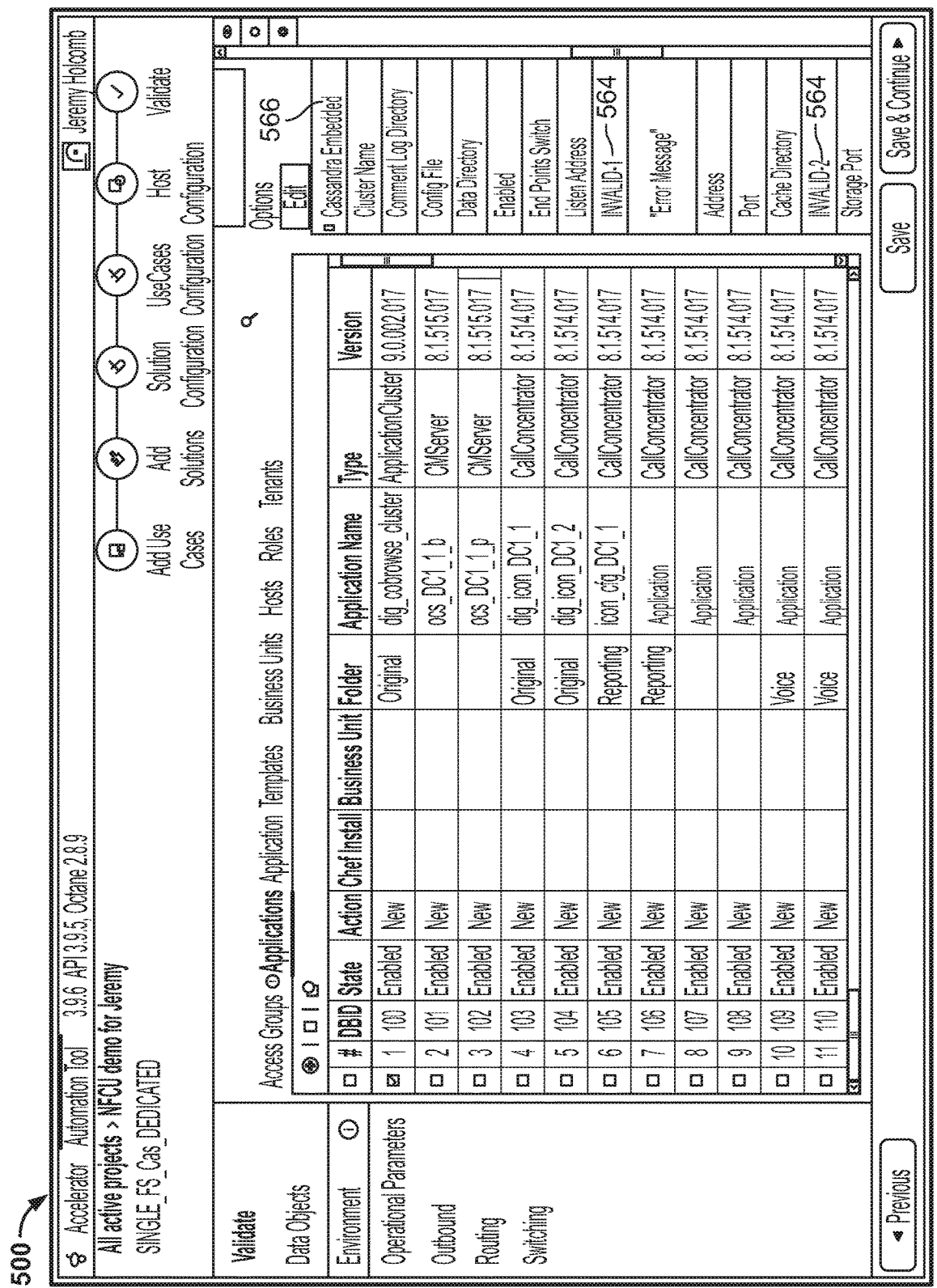
Figure 26:
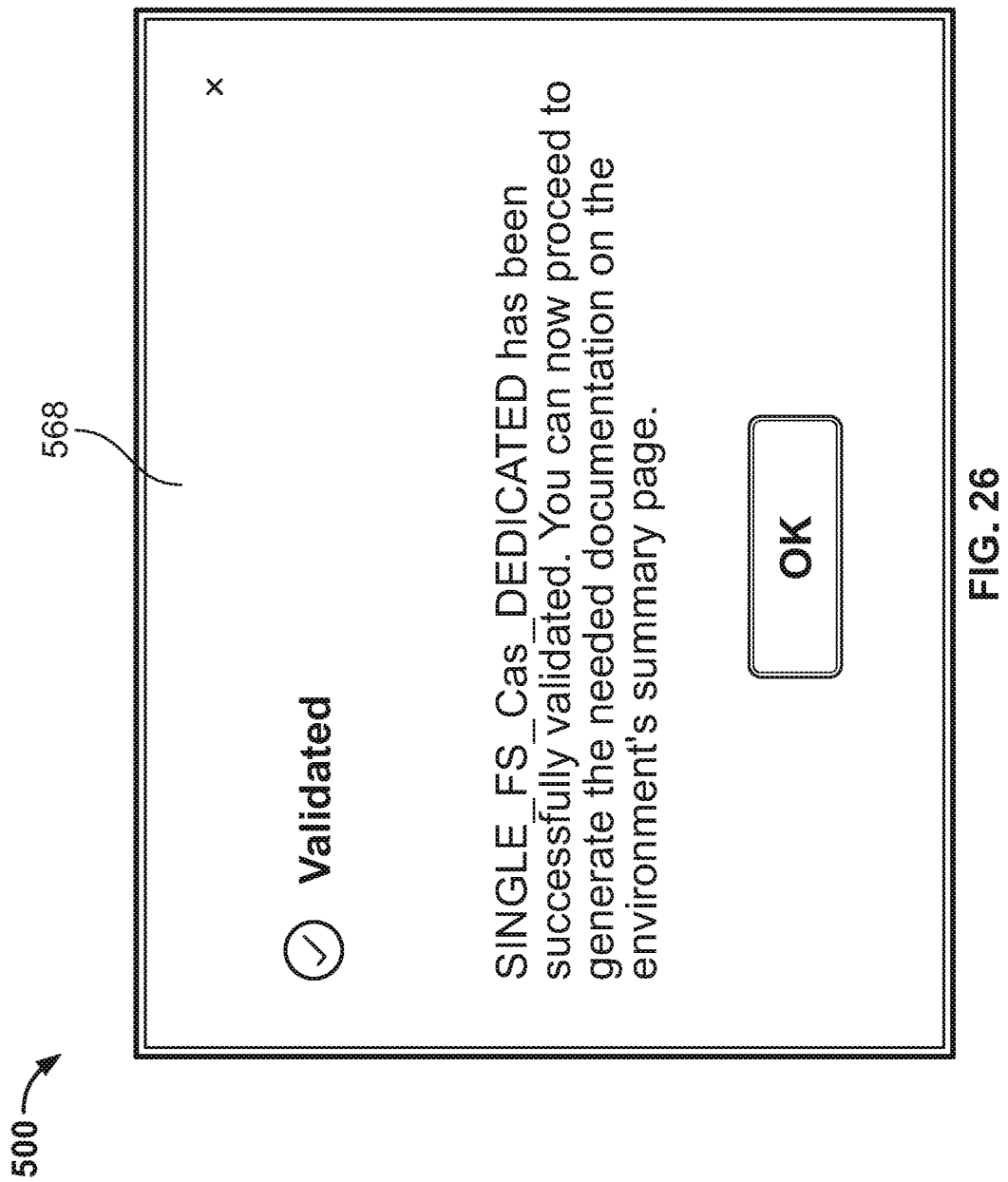
Figure 27:
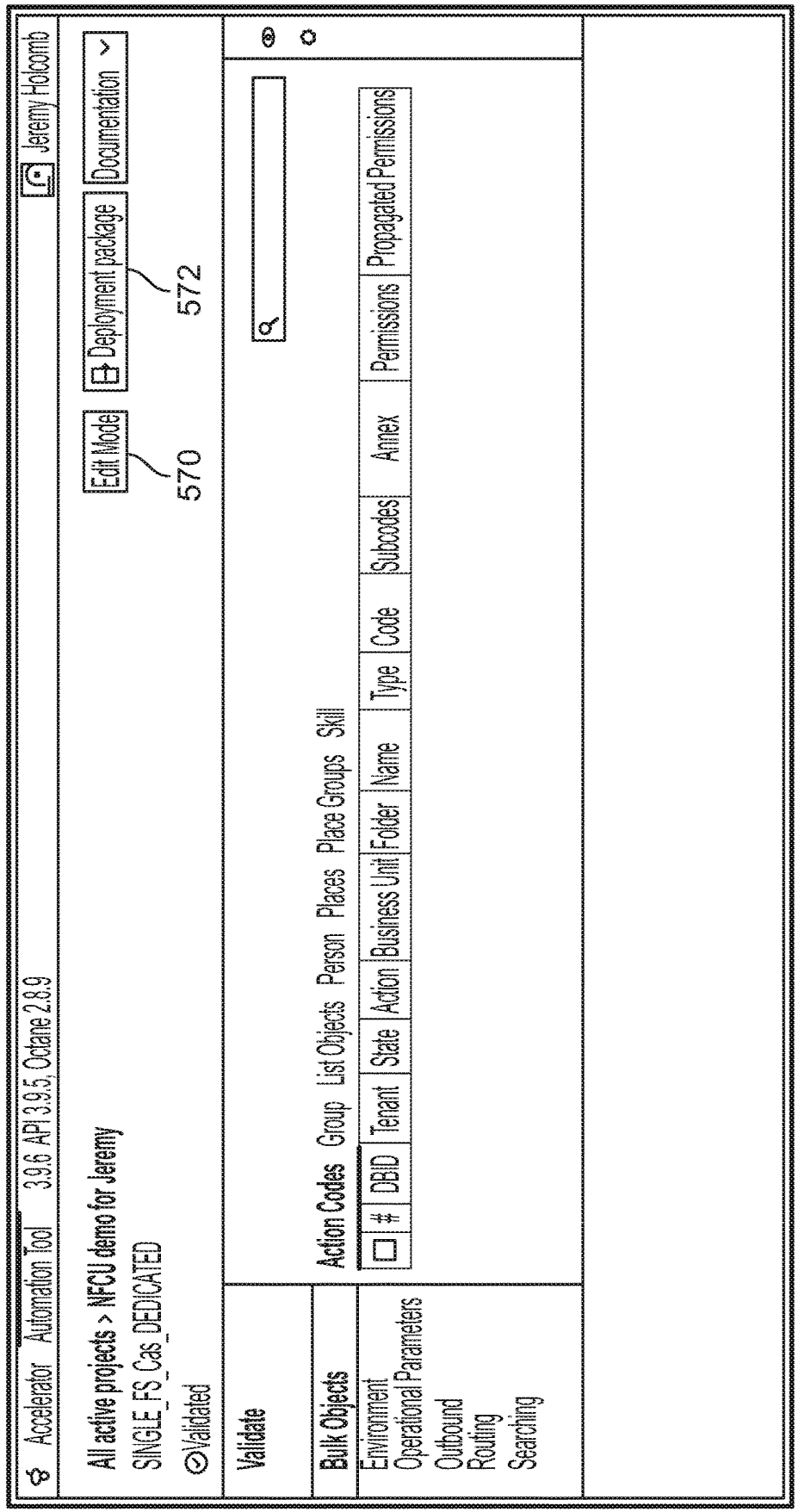

If the user selects the "validate" button 548 and there are errors with the environment information, the graphical user interface 500 may display an error message 552 (see FIG. 21). In some embodiments, the graphical user interface 500 identifies the particular errors with one or more error indicators 554, 556 for the user's correction (see FIG. 22). As shown, in the illustrative embodiment, the error is associated with one of the applications. If the error indicator 556 is selected, the graphical user interface 500 may open a display that describes the location 558 of the error (see FIG. 23). By selecting the particular application 560 having the error, the user may scroll through the application's information to identify and correct the error. As shown in FIG. 24, in the illustrative embodiment, the error is location in the "options" section of the application, which may be signified by red lines surrounding the "options" button 562. Navigating to the "options" tab, the graphical user interface 500 highlights various errors 564 for correction in a particular section 566 (see FIG. 25). After the errors have been addressed, the user may re-validate the environment. As shown in FIG. 26, the graphical user interface may display a message 568 indicating that the validation has been successful. Having been successfully validated, the user may further edit the information by selection the "edit" button 570 or create the validated deployment package by selecting the "deployment package" button 572 as shown in FIG. 27.

What is claimed is:

1. A method for automated deployment of application servers in a contact center system, the method comprising:
generating a deployment package for the application servers in the contact center system based on deployment sizing information and environment information associated with the contact center system, wherein the environment information comprises a name and an address of a physical server to which at least a portion of software is to be deployed, and wherein the deployment package includes information needed to bootstrap each of the application servers, install applications to the application servers, and execute post-installation and environment-readiness processes;
validating an accuracy of the environment information against the contact center system based on a set of rules, wherein validation of the accuracy of the environment information includes an automated determination of at least an existence of a device having the name and the address of the physical server to which at least the portion of the software is to be deployed;
preparing, in response to successful validation of the environment information, a temporary deployment server of the contact center system for deployment of software to the application servers; and
installing the software to the application servers using the temporary deployment server.

2. The method of claim 1, wherein the deployment sizing information comprises an estimate of resource utilizations for the contact center system.

3. The method of claim 1, further comprising determining one or more deployment configuration standards; and
wherein generating the deployment package comprises generating the deployment package for the application servers in the contact center system based on the deployment sizing information, the environment information associated with the contact center system, and the deployment configuration standards.

4. The method of claim 1, further comprising determining one or more operational parameters for the contact center system; and
wherein generating the deployment package comprises generating the deployment package for the application servers in the contact center system based on the deployment sizing information, the environment information associated with the contact center system, and the operational parameters.

5. The method of claim 1, wherein preparing the temporary deployment server of the contact center system comprises loading configurations for the contact center system into the temporary deployment server based on the deployment package.

6. The method of claim 1, wherein generating the deployment package for the application servers comprises:
receiving user input to add one or more use cases for the contact center system to the deployment package;
determining a plurality of alternative interdependencies for the software to be installed to the application servers based on the added one or more use cases for the contact center system; and
receiving a user selection of software associated with one or more of the plurality of alternative interdependencies to be installed to the application servers.

7. A system for automated deployment of application servers in a contact center system, the system comprising:
at least one processor; and
at least one memory comprising a plurality of instructions stored thereon that, in response to execution by the at least one processor, causes the system to:
generate a deployment package for the application servers in the contact center system based on deployment sizing information and environment information associated with the contact center system, wherein the environment information comprises a name and an address of a physical server to which at least a portion of software is to be deployed, and wherein the deployment package includes information needed to bootstrap each of the application servers, install applications to the application servers, and execute post-installation and environment-readiness processes;
validate an accuracy of the environment information against the contact center system based on a set of rules, wherein validation of the accuracy of the environment information includes an automated determination of at least an existence of the physical server to which at least the portion of the software is to be deployed based on the name and the address of the physical server to which at least the portion of the software is to be deployed;
prepare a temporary deployment server of the contact center system for deployment of software to the application servers in response to successful validation of the environment information; and
install the software to the application servers using the temporary deployment server.

8. The system of claim 7, wherein the plurality of instructions further causes the system to determine one or more deployment configuration standards; and
wherein generation of the deployment package comprises generation of the deployment package for the application servers in the contact center system based on the deployment sizing information, the environment information associated with the contact center system, and the deployment configuration standards.

9. The system of claim 7, wherein the plurality of instructions further causes the system to determine one or more operational parameters for the contact center system; and
wherein generation of the deployment package comprises generation of the deployment package for the application servers in the contact center system based on the deployment sizing information, the environment information associated with the contact center system, and the operational parameters.

10. The system of claim 7, wherein to generate the deployment package for the application servers comprises to determine interdependencies for the software to be installed to the application servers.

11. A system, comprising:
a contact center system including a temporary deployment server and a plurality of application servers; and
a server comprising a processor and a memory having a plurality of instructions stored thereon that, in response to execution by the processor, causes the server to generate a deployment package for the application servers in the contact center system based on deployment sizing information, one or more deployment configuration standards, and environment information associated with the contact center system, wherein the environment information comprises a name and an address of a physical server to which at least a portion of software is to be deployed, and wherein the deployment package includes information needed to bootstrap each of the application servers, install applications to the application servers, and execute post-installation and environment-readiness processes, and to validate an accuracy of the environment information against the contact center system based on a set of rules, wherein validation of the accuracy of the environment information includes an automated determination of at least an existence of some physical server having the name and the address of the physical server to which at least the portion of the software is to be deployed;
wherein the temporary deployment server of the contact center system is prepared for deployment of software to the application servers in response to successful validation of the environment information; and
wherein the temporary deployment server installs the software to the application servers.

12. The system of claim 11, wherein to generate the deployment package for the application servers comprises to determine interdependencies for the software to be installed to the application servers.

13. The method of claim 1, further comprising decommissioning the temporary deployment server in response to installing the software to the application servers.

14. The method of claim 1, wherein the software includes a plurality of software applications including at least a first application and a second application; and
wherein generating the deployment package for the application servers comprises determining whether operation of the first application is dependent on proper installation and configuration of the second application.

15. The method of claim 3, further comprising dynamically updating the one or more deployment configuration standards based on machine learning.

16. The system of claim 7, wherein the plurality of instructions further causes the system to prompt a user to provide accurate data to replace erroneous data identified from the validation of the environment information against the contact center system; and
wherein to prepare the temporary deployment server of the contact center system is in response to the user providing the accurate data.

17. The system of claim 7, wherein the validation of the environment information includes an automated determination that (i) devices referenced by the environment information exist and (ii) resource addresses, usernames, passwords, and credentials referenced by the environment information are accurate.

18. The method of claim 1, wherein the deployment sizing information identifies an estimated resource utilization by the application servers as deployed with respect to each of virtual machines, hypervisors, processor utilization, memory utilization, input/output operations per second, and database utilization.

19. The method of claim 1, wherein the environment information further identifies directories to which to install the applications to the application servers and to store relevant data to the application servers.

20. The method of claim 1, wherein the deployment sizing information is stored in a JavaScript Object Notation (JSON) file format.

* * * * *